United States Patent [19]

Kulakowski et al.

[11] Patent Number: 5,303,214
[45] Date of Patent: Apr. 12, 1994

[54] MULTI-MEDIA-TYPE AUTOMATIC LIBRARIES

[75] Inventors: John E. Kulakowski; Rodney J. Means, both of Tucson, Ariz.

[73] Assignee: International Business Machines Corporation, Armonk, N.Y.

[21] Appl. No.: 816,590

[22] Filed: Jan. 3, 1992

[51] Int. Cl.$^5$ .............. G11B 17/22; G11B 15/68
[52] U.S. Cl. .................. 369/34; 369/174; 369/36; 360/98.04; 395/425; 235/385
[58] Field of Search ............. 369/34, 36, 191, 192; 360/92, 98.06, 98.04, 178, 98.05; 395/425; 235/385; 371/66

[56] References Cited

U.S. PATENT DOCUMENTS

| | | | |
|---|---|---|---|
| 3,134,550 | 5/1964 | Camras | 242/55.13 |
| 3,715,040 | 2/1973 | Polus et al. | 214/16.4 R |
| 3,831,197 | 8/1974 | Beach et al. | 360/71 |
| 4,327,834 | 5/1982 | Kalthoff et al. | 209/609 |
| 4,579,499 | 4/1986 | Mikes | 414/273 |
| 4,675,856 | 6/1987 | Rudy et al. | 369/34 |
| 4,786,229 | 11/1988 | Henderson | 414/786 |
| 4,791,626 | 12/1988 | Staar | 369/37 |
| 4,903,815 | 2/1990 | Hirschfeld et al. | 194/205 |
| 4,959,774 | 9/1990 | Davis | 371/66 |
| 4,984,108 | 1/1991 | Grant et al. | 360/92 |
| 4,989,191 | 1/1991 | Kuo | 369/33 |
| 5,016,127 | 5/1991 | Inoue et al. | 360/92 |
| 5,018,060 | 5/1991 | Gelb et al. | 364/200 |
| 5,034,915 | 7/1991 | Styrna et al. | 371/66 |
| 5,034,935 | 7/1991 | Ishibashi et al. | 360/92 |
| 5,056,073 | 10/1991 | Fitzgerald et al. | 369/34 |
| 5,164,909 | 11/1992 | Leonhardt et al. | 369/34 |
| 5,175,847 | 12/1992 | Mellot | 371/66 |

*Primary Examiner*—Stuart S. Levy
*Assistant Examiner*—Paul J. Ditmyer
*Attorney, Agent, or Firm*—H. F. Somermeyer

[57] ABSTRACT

A data storage system has a media cartridge library subsystem. The subsystem includes a cartridge storage array which has receptacles for removably receiving cartridge holding bins. Each bin stores a plurality of cartridges in slots. The slots are arranged to open to a transport system in the subsystem such that the bins held in the receptacles constitute a storage array of cartridges. Cartridges are inserted into and removed from the subsystem either by an IO bin or station or by removing and inserting cartridge containing bins. Cartridges are assignable to affinity groups; such affinity cartridges in an affinity group are stored in affinity bins. An affinity bin cannot be removed from the subsystem until all of the affinity cartridges assigned to the bin are present. Each of the bins and cartridges have bar code labels. A battery operated bar code read is transportable by the cartridge transport means for reading the bar code labels. An infrared communication system transmits information and control signals between the bar code reader and a control in the subsystem. Methods and apparatus for operating the subsystem are described.

84 Claims, 16 Drawing Sheets

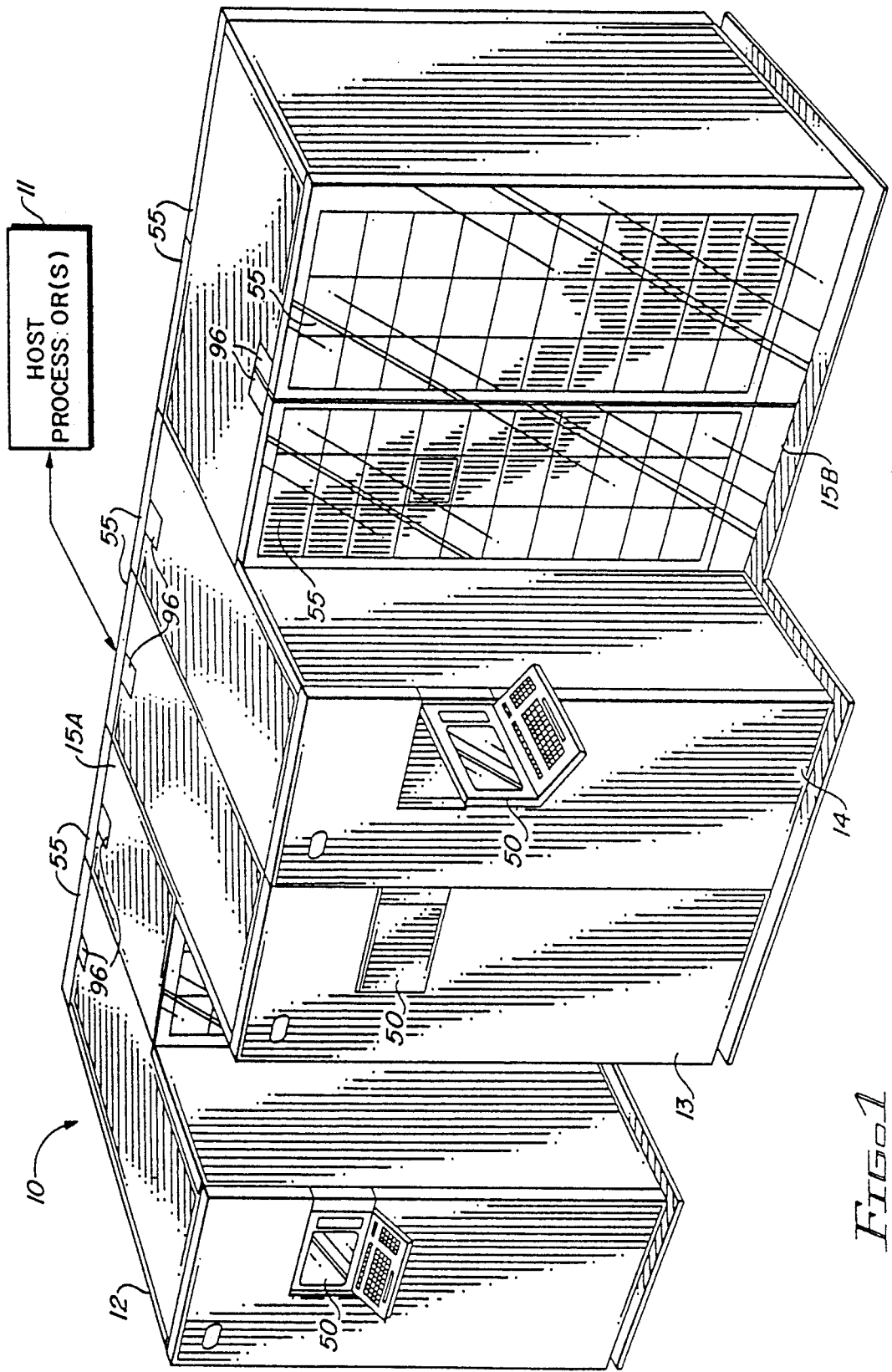

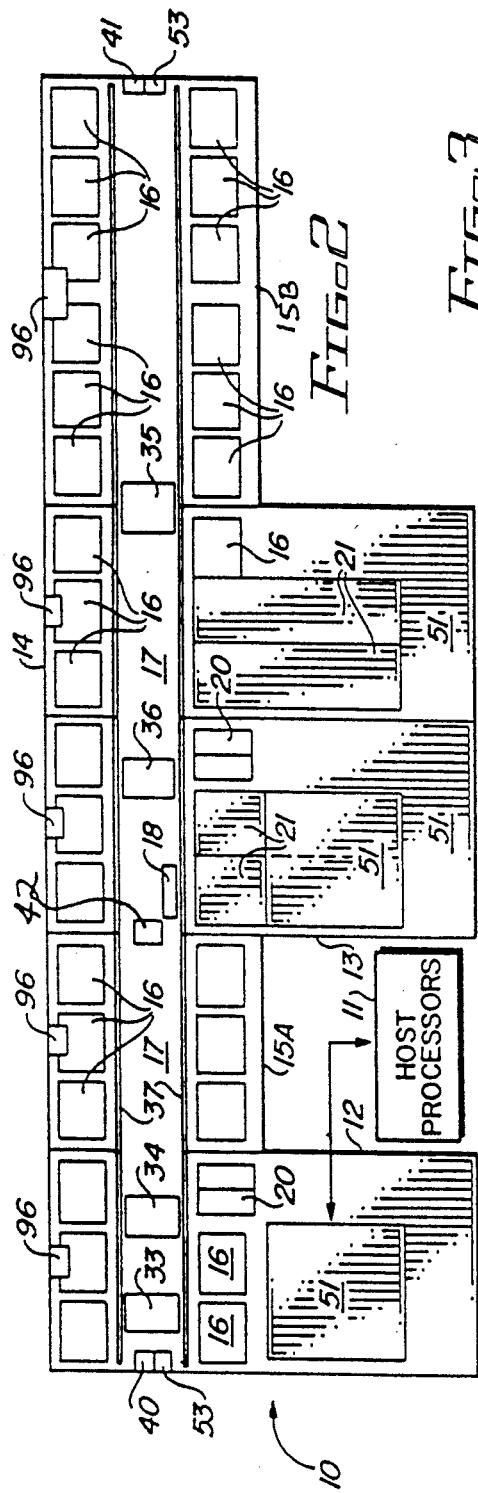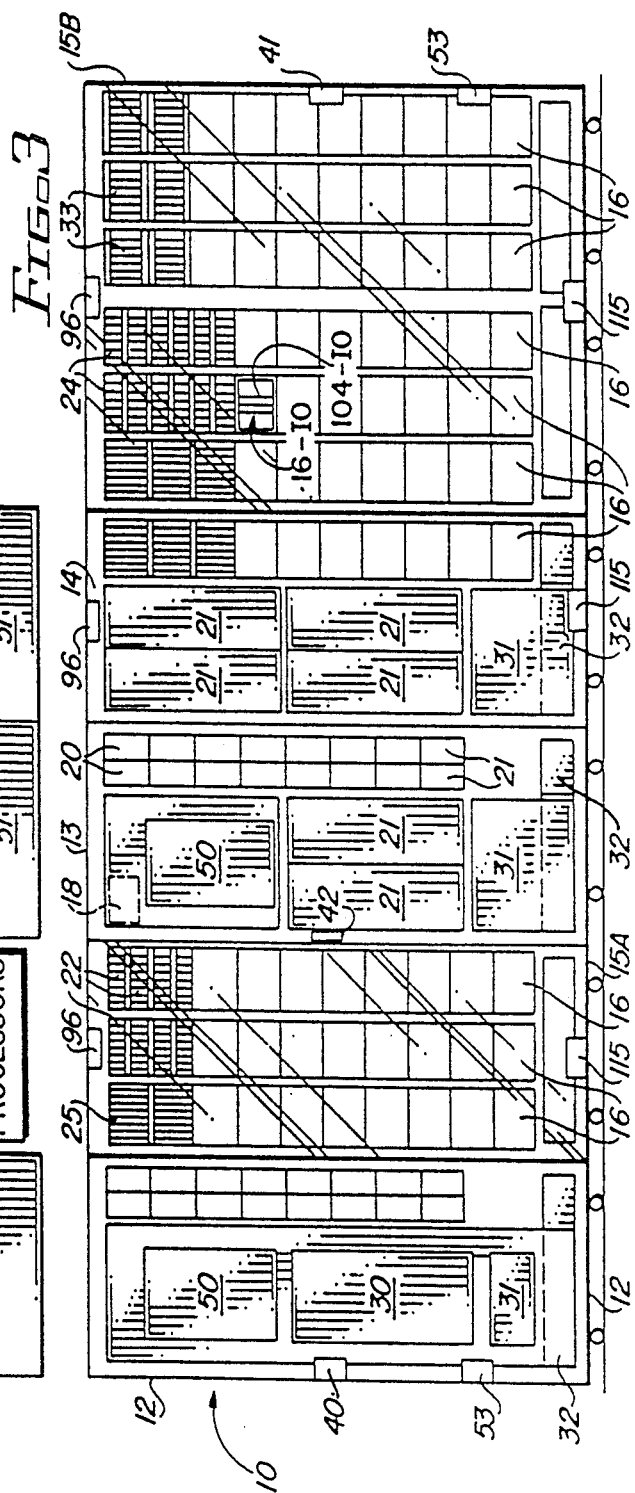

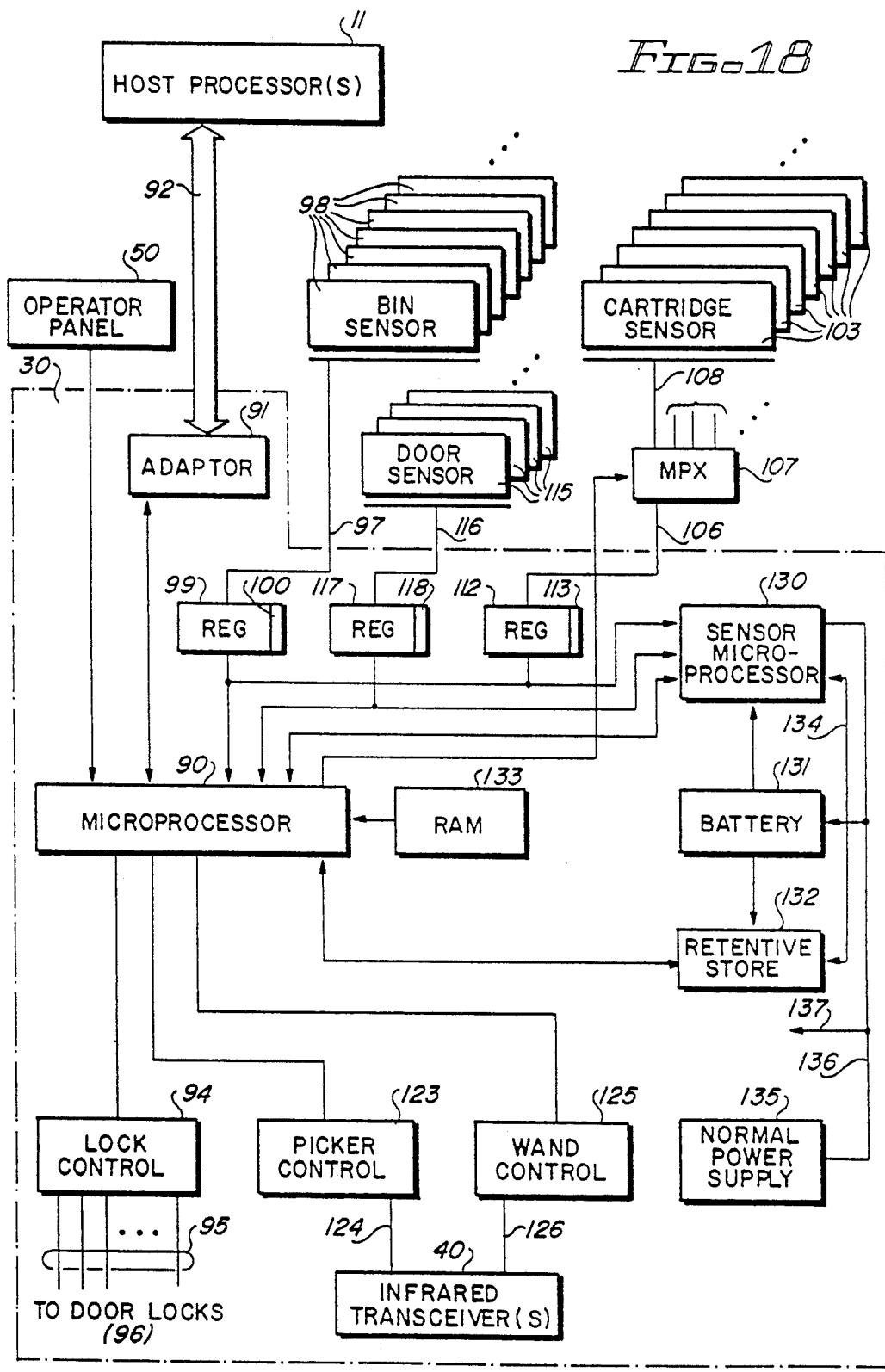

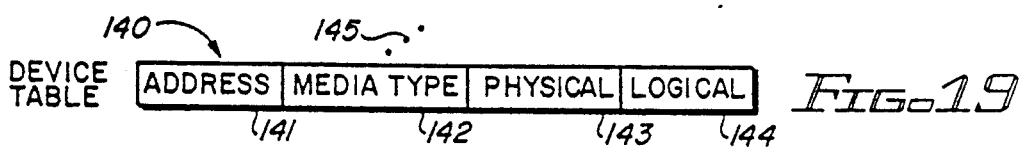
FIG. 19
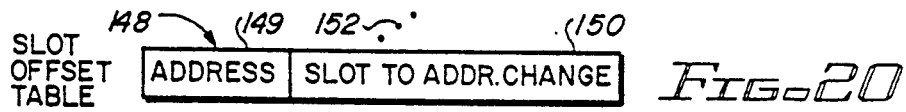
FIG. 20
| BIN SLOT NUMBER | VOLSER | POINTERS | BAR CODE | POINTERS | STATUS & TYPE | BIN BAR CODE |
|---|---|---|---|---|---|---|
| 1 ⋮ N | | | | | A-XY ↕ V | BIN 1 BAR CODE |
| N+1 ⋮ 2N | | | | | A-CD ↕ O | BIN 2 BAR CODE |
| 2N+1 ⋮ 3N | | | | | A-BC ↕ O | BIN 3 BAR CODE |
| 3N+1 ⋮ ⋮ ⋮ KN | ⋮ | ⋮ | ⋮ | ⋮ | ⋮ | ⋮ BIN K BAR CODE |
FIG. 21
FIG. 22
| 1 | 2 | 3 | 4 | 5 | 6 | 7 | 8 | 9 | 10 | 11 | 12 | 13 |
|---|---|---|---|---|---|---|---|---|---|---|---|---|
| A | A | A | A | A | A | R | R | R | R | E | O | O |
FIG. 23

ANALYSIS TO RELATE VOLSER TO CARTRIDGE/BIN POSITION IN LIBRARY

REMOVING CARTRIDGES

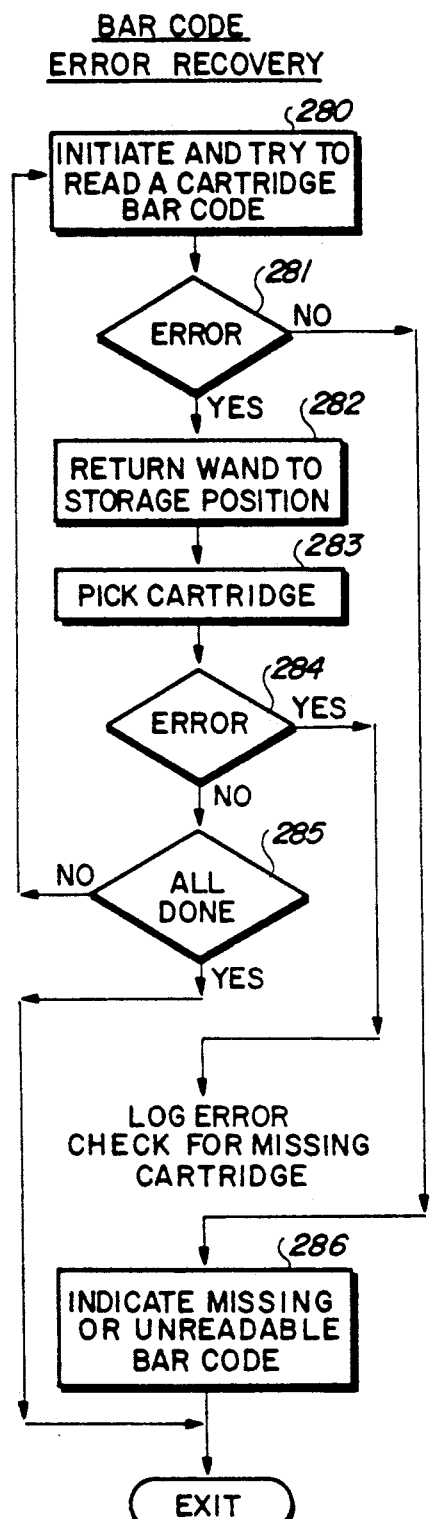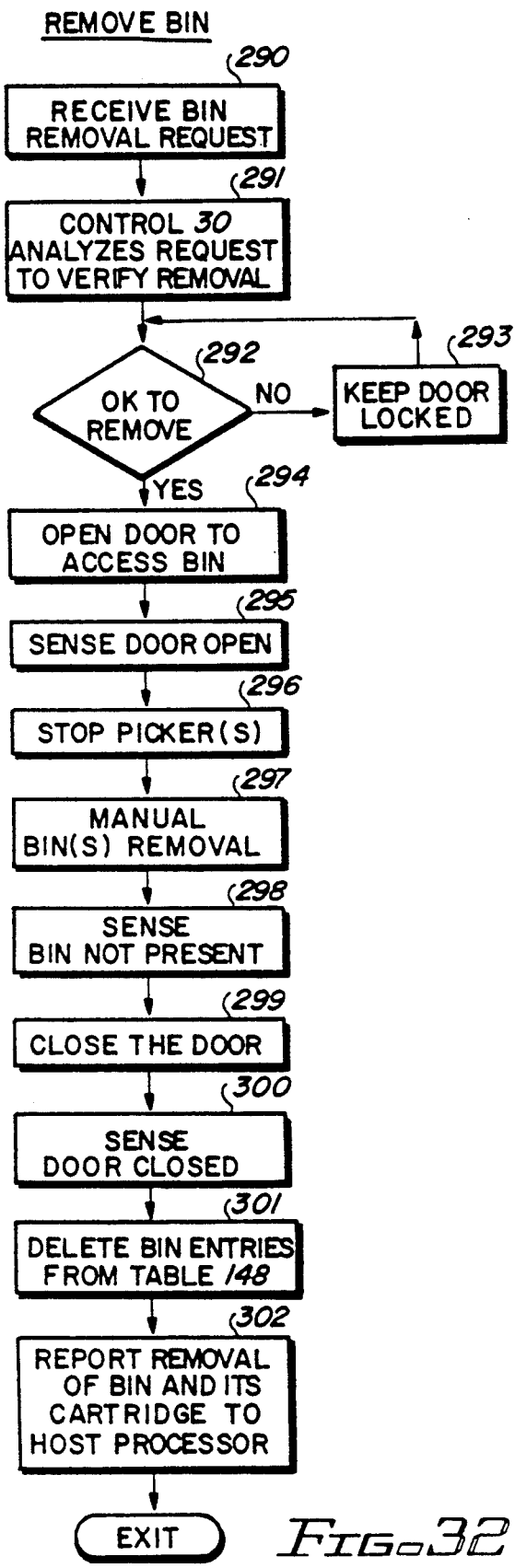
FIG. 31
FIG. 32

MULTI-MEDIA-TYPE AUTOMATIC LIBRARIES

FIELD OF THE INVENTION

The present invention relates to data processing peripheral data storage systems. More particularly, the invention relates to automatic data storage and retrieval systems employing diverse and incompatible data storing cartridges.

BACKGROUND OF THE INVENTION

To date, media libraries having automatic storage and retrieval capabilities have been limited to one type of media containing cartridge. For example, the Beach U.S. Pat. No. 3,831,197 shows a tape library which automatically stores and retrieves data-storing tape cartridges—all of the tape cartridges have the same physical outline shape. Similarly, other media library systems have the same limitation. Beach shows a travelling elevator system for fetching and storing cartridges from and to addressed compartments in the library storage array. Power and control is transmitted to the travelling elevator via a flexible flat cable.

In the last years there has been a proliferation of differently shaped media cartridges. For example, there are the well known VHS video cartridges, the 8 mm video cartridges, the 3.5 inch magnetic disk data-storing cartridges, the 3.5 and 5.25 inch optical media cartridges, differently sized and shaped magnetic tape cartridges, etc. Diverse optical media types are known, such as read-only (CD-ROMs, for example), write-once read-many (WORM) consisting of diverse media such as ablative, phase change, etc., and rewriteable media. Such rewriteable media includes the well known magnetic tapes and disks, magnetooptical disks, and the like. It is desired to enable using a single media library construction for accommodating a plurality of differently shaped information or data-storing cartridges in one modularly constructed library apparatus.

DISCUSSION OF THE PRIOR ART

The Camras U.S. Pat. No. 3,134,550 shows a tape library system using a single type of tape cartridge. The single-spool tape cartridges are stored in trays, each tray storing ten cartridges. The trays are individually and selectively transported from a storage array to a work station. The work station includes a carousel. A mechanism selectively transfers a cartridge from a tray adjacent the carousel to the carousel. The carousel is rotated so that a cartridge picker transfers the cartridge to a tape drive which automatically records signals onto the retrieves signals stored on the tape in the tape cartridge. Each tape cartridge is identified by a machine sensible indicium embossed on the tape leader.

The Polus et al U.S. Pat. No. 3,715,040 is cumulative to the teaching of Camras, supra, in that a plurality of like-shaped tape cartridges are moved in a tray. Each tray is stored in a compartment in an array of such compartments. All trays, have the same shape and size and each tray stores a like number of the tape cartridges.

Mikes U.S. Pat. No. 4,579,499 (priority Austria Jul. 6, 1982) shows a storage device for a number of different articles of different shapes. The articles are held in containers placed in a receiving frame; each article being deposited on a resting surface of a container. A retaining mechanism is provided to releasably retain the articles on the resting surface. Each container is uniquely coded for automatic identification. A purpose of this patent teaching is to call for a given specific container from the resting surface, i.e. addressing any container. Mikes provides a control which transmits a pulse-code modulated carrier for indicating a container. When a code read from a container matches the transmitted code, then the identified container is removed from the resting surface. Such control is used for selectively filling the containers from a conveyor belt.

The Henderson U.S. Pat. No. 4,786,229 shows a document storage and retrieval system having a plurality of containers, each container having machine readable or sensible indicia for identification. Automatic palletizing apparatus positions the containers on pallets. The identification of the containers on each pallet is correlated to the address in the storage system at which the pallet is to be stored. Retrieval of a container requires accessing a pallet, removing the container from the pallet. All of the remaining containers are repalletized on a different pallet and assigned a new address (sic location) in the storage system. Each pallet is assigned a unique location in the storage system.

Staar in U.S. Pat. No. 4,791,626 describes a circular storage array for cards or disks. A plurality of containers or carriers have a plurality of disk or card receiving slots. A rotary changer is disposed in the interior of the circular array for access in the slots for fetching and storing disks or cards therefrom. All media in the library has the same physical outline shape and uses the same picker arrangement.

Hirshfeld et al in U.S. Pat. No. 4,903,815 show a vending machine which accesses article storing compartments via reading identification (ID) codes on the compartments. A gripper fetches an article from a selected compartment for delivery to an output station of the vending machine. The illustrated vending machine is for VHS video tape cartridges all of which have the same physical outline shape.

Grant et al in U.S. Pat. No. 4,984,108 show transportation apparatus for different size magnetic tape cassettes. A cassette gripper assembly accommodates different sizes of tape cassettes. Two accessing mechanisms for accessing the tape cassettes are provided. Two sizes of tape cassettes are stored and retrieved. Each modular cabinet in the storage array store the same sized tape cartridges. Adjacent cabinets may store different sized tape cassettes.

Kuo in U.S. Pat. No. 4,989,191 shows a data processing system with mixed media memory packs. Each memory pack includes a random access memory for identifying a plurality of analog (video) tape cassettes in the memory pack. All of the tape cassettes have the same outline shape.

SUMMARY OF THE INVENTION

The present invention relates to enhancing intermixing media types in a single magnetic media library apparatus. Such enhancement includes both enhanced physical flexibility and effective controls.

In accordance with the invention, apparatus is provided for storing and retrieving diverse media respectively having different physical and data handling characteristics. A cabinet means has a first open side. A cartridge storage array means is disposed in the cabinet means adjacent said first open side and has first and second oppositely facing open sides. A plurality of like-size bin receptacles are in said cabinet means. All bins are modular; that is, have a size which is an integral multiple of a minimal size. Such bin arrangements facilitate transferring large amounts of data between low-performance and high-performance systems. Each receptacle has a cartridge bin access opening respectively at said first and second open sides for receiving and yielding bins each of which is capable of storing a plurality of media containing cartridges. An openable door is on said first side of the cabinet means for closing the first side for preventing access to said receptacles. Door sensing means is on one of said means and disposed in juxtaposition to said openable door for sensing and indicating whether the openable door is closed or open. Bin sensing means are disposed in each of said receptacles adjacent said second open side of the array means for sensing and indicating the presence or absence of a bin in the respective receptacle. A plurality of cartridge receiving media devices is disposed in the cabinet means. A first one of said media devices is capable of receiving and operating only with a first type of media cartridge having a first cartridge outline. A second one of said media devices is capable of receiving and operating only with a second type of media cartridge having a second cartridge outline. The said first and second cartridge outlines have different physical dimensions. Cartridge transport means is movably mounted in the cabinet means for accessing any one of said receptacles and said plurality of cartridge-receiving media devices for transporting either of said first or second types of media cartridges between said receptacles and said first and second devices, respectively. Control means has means indicating which of said bins in said receptacles contain said first and second types of media cartridges. The control means is connected to both said sensing means for responding to their respective indications to enable the cartridge transport means to transfer cartridges only when said door sensing means indicates said door is closed. Media cartridges are transferred to and from the receptacles indicated by said bin sensing means as containing one of said cartridge containing bins holding either said first or second type of media cartridges respectively for said first or second one of said devices. Means are provided for automatically reading and verifying bar code labels on each of the cartridges and bins. Infra-red (IR) communication links are provided to connect the transport and the bar code reader. The bar code reader is preferably a battery operated wand pickable and transportable by the transport mean for reading any of the bin or cartridge bar code labels. Cartridge audit, ingress and egress means and controls ensure integrity of a multi-media library peripheral data-storing subsystem.

The foregoing and other objects, features, and advantages of the invention will be apparent from the following more particular description of preferred embodiments of the invention, as illustrated in the accompanying drawings.

DESCRIPTION OF THE DRAWINGS

FIG. 1 is a perspective view of apparatus constructed using the present invention.

FIG. 2 is a diagrammatic plan view of the FIG. 1 illustrated apparatus showing its internal physical layout.

FIG. 3 is a diagrammatic elevational view of the FIG. 1 illustrated apparatus showing its internal physical layout.

FIG. 18 is a block diagram of a system for controlling the FIG. 1 illustrated apparatus in accordance with the present invention.

FIGS. 19 through 22 diagrammatically show illustrative data structures for controlling the FIG. 1 apparatus including, respectively, the layout of a device table, arrangement of a storage bin slot offset table, cartridge identification and location table and pointer anchors as used by the FIG. 18 illustrated apparatus.

FIG. 23 diagrammatically illustrates cartridge occupancy of a storage bin of the FIG. 1 illustrated apparatus which includes both cartridges having an affinity for each other, cartridge slots reserved for cartridges with said affinity and available unrestricted cartridge slots.

FIGS. 24 through 32 are machine operations charts illustrating operation of the FIG. 1 illustrated apparatus in accordance with the present invention and respectively showing machine operations as labelled in these figures.

DETAILED DESCRIPTION

Figures 14A, 14B:
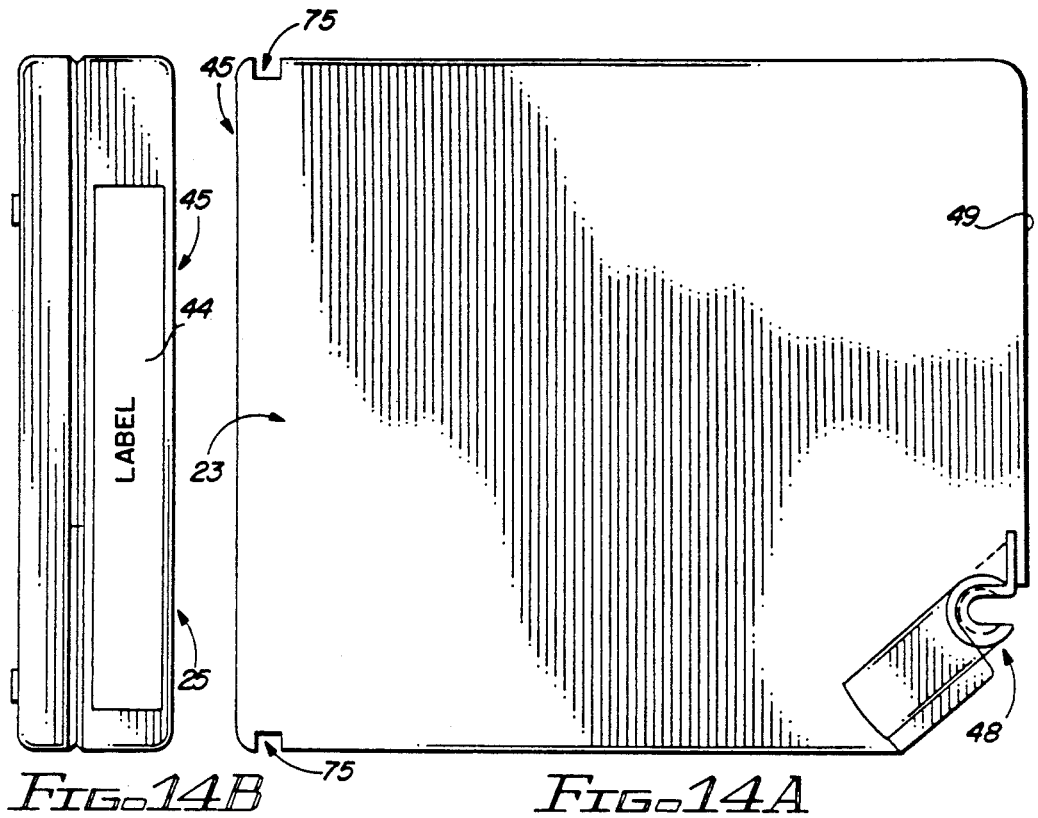

Referring now more particularly to the appended drawing, like numerals indicate like parts and structural features in the various figures. FIGS. 1-3 show a large multi-cabinet multi-media library data storage subsystem 10 employing the present invention. Subsystem 10 is connected to host processor(s) 11 in a usual manner. Subsystem 10 includes cabinets 12-14 which house both media containing cartridges, control circuits, media devices (recorders and players) and the like as will become apparent. Cabinets 15A and 15B house only cartridges, all as later described. These cartridge only cabinets include any one of several mechanical construction so long as like-sized or modularly-sized bins are usable therein. The term modularly-sized bins indicates that all bins are an integral multiple of a minimum bin size. Media cartridges are transferred between a large plurality of cartridge storage receptacles 16 by a transport system 17 and a selected one of the media devices (also termed drives, recorders, players and the like) 20, 21 and 21A. A plurality of devices 20 (FIG. 7) read and record optical media contained in a "small" optical disk containing cartridge 22 (FIG. 16) which contain a 90 mm optical disk. Other optical devices may be employed that operate with different diameter disks 25. Typically optical disks 25 have 90 mm (3.5 inches), 130 mm (5.25 inches), 200 mm, ten or twelve inches. The disks 25 are transportable to and from optical disk devices 20 particularly designed therefor. A later described control (FIG. 18) manages the cartridge transportation for ensuing the media types go only to the appropriate devices, as will become apparent. Rectangular optical record cards (not shown) may also be used with other devices (not shown). Similarly, a plurality of magnetic devices 21 (FIG. 6) are included in the subsystem 10. The magnetic devices 21 in cabinet 13 are designed to operate with tape cartridges 23 shown in FIGS. 14A and 14B. Such tape cartridges are those used with the IBM 3490 tape subsystems, for example. The magnetic devices 21 in cabinet 14 do not operate with the tape cartridges 23, rather these latter devices operate with tape cartridges 24 shown in FIGS. 15A and 15B. Magnetic devices 21A (FIG. 8) in cabinet 14 operate with cartridges 24. In accordance with the present invention, all three incompatible media cartridges are storable in any of the receptacles 16 and, under the later described controls, are transported between the respective receptacles and the appropriate device for performing data processing operations, as will become apparent.

Figure 33:
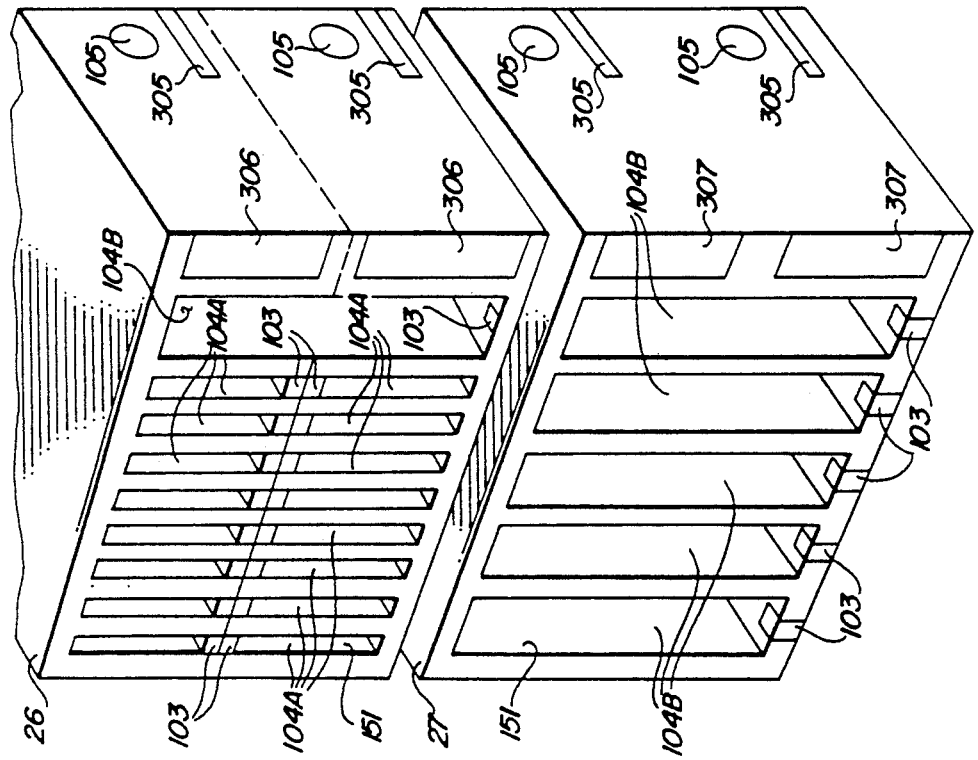
FIG. 33 diagrammatically illustrates two diverse sized bins having cartridge present sensors and bin-presence sensible indicia and being usable with the FIG. 1 illustrated apparatus.

Host processor 11 supplies requests to subsystem 10 for storing and retrieving data, such data being stored in any one or more of the media cartridges. Subsystem 10 responds to the host processor 11 requests by moving media cartridges from their respective storage receptacles 16. All media cartridges are stored in removable storage bins. As seen in FIG. 33, half-sized bin 26 and full-size bin 27 respectively store small and large cartridges. Two bins 26 are insertable into one of the receptacles 16 while one bin 27 is insertable into a receptacle. Each of the receptacles receive either type of bin. Control means (peripheral controller or host processor 11) 30 contains a microprocessor which executes programs for communications with host processor 11 (as is usual) and for controlling the operation of subsystem 10 for implementing the present invention and for performing other known machine operations usually associated with such a subsystem. It is preferred that control 30 be in one of the cabinets, such as cabinet 12. Each of the cabinets housing devices 20, 21, 21A or control 30 has its own power supply 31 and cooling system 32.

The cartridge transporting means includes a plurality of travelling elevators (also termed "pickers") 33-36. As shown in FIG. 2, pickers 33 and 34 both service cabinets 12 and 15A while pickers 35 and 36 service cabinets 13, 14 and 15B. A pair of spaced-apart stationary rails 37 movably support the pickers for movements along the open face of the storage racks (FIG. 34) in the cabinets and that have receptacles 16, devices 20-21A, etc. Power for moving the pickers and powering the electrical circuits which control the cartridge grippers may be provided by a light weight flexible power cable (not shown) or may be transmitted over the rails 37 in a usual manner. Control and status signals may be communicated between each of the pickers and control 30 via a flexible cable (not shown). It is preferred that an infrared (IR) communication system be employed for reducing cable drag on the pickers. To this end, IR transceivers 40-41 are mounted at the ends of the transporting means as best seen in FIGS. 2 and 3. The transceivers are preferably mounted about one-half the height of the pickers. Control means 30 is electrically connected to all of the transceivers for sending and receiving control and status information to and from any of the transceivers, all as best seen in FIG. 18.

Each of the bins 26, 27 (FIG. 33), insertable into any one of the bin receptacles 16, has a bar code label 44 (FIG. 13) identifying the bin. Such identification may include type of bin, i.e. type of cartridges stored, whether multiple types of cartridges are stored. It is preferred that a bar code label be affixed to each bin on a surface facing transport system 17 for bar code reading internally to library subsystem 10. Also, a bar code label (not shown) is preferably affixed on an outwardly facing surface for external bar code reading. Externally readable bar code labels enable an operator to open a door 55 and verify bin identification before removing same, for external audits and the like.

Similarly, such a bar code label 44 is affixed to an identifying internally-facing surface of each of the cartridges in the subsystem. Surface 45 of cartridge type 23 (FIG. 14B), surface 46 of cartridge type 24 (FIG. 15A) and surface 47 of cartridge type 22 (FIG. 16) each contain a bar code uniquely identifying the cartridge, such as type code, volume serial number (VOLSER), library serial number, job reference number, later described affinity name(s) and the like. It is preferred that VOLSER be included in the bar code label. Such VOLSER should be unique within subsystem 10. The VOLSER may have coding indicating a relationship to a host processor 11 application program, a host system data class of the informational content, the bin to which a cartridge was originally assigned, affinity (later described) grouping, data classes (host processor 11 classification of the data stored in a cartridge), and the like. The range of alphanumeric names (numbers) for bins are separate from the cartridge alphanumeric names. A prefix or suffix may be used as a bin/cartridge indicator. It is preferred that the bar code surfaces 44-46 be a surface facing away from an edge of the cartridge at which access into the cartridge is effected by the respective devices. This arrangement enables a picker to insert any cartridge into a device such that the access portion 46 of the cartridges enters the device first. This arrangement also means that the bar code label, also termed a internally (internal to the library system 10) readable label, always faces toward transport system 17 reading the bar codes internally of library subsystem 10 enabling accessing, verifying, auditing the cartridges. Auditing includes checking for duplicate bar code values. Duplicate bar code values is an error condition which preferably is corrected immediately. As an alternate, other cartridge parameter data, such as affinity class may be used to distinguish between two cartridges having a same bar code value.

Cartridges 22, 23 and 24 also may have externally readable bar code labels. It is preferred that the internal and external bar code labels be identical, not limitation thereto intended. Cartridge 23 shown in FIGS. 14A and 14B holds an external bar code label on outwardly facing surface 49. Cartridge 24 (FIGS. 15A and 15B) is modified to accommodate both internal and external bar code labels. Orientation of cartridge 24 as stored in bins 26, 27 is rotated ninety degrees. The cartridge slots in the bins 104B (FIG. 33) are used rather than slots (not shown) having the same height at slots 104A and the width of slots 104B are used. Outwardly-opening gripper-slots 76 are formed into the housing for enabling grasping cartridge 24 such that surfaces 87 and 88 are vertical. Surface 87 holds the internal bar code label while surface 88 holds the external bar code label. Cartridge 22 (FIG. 16) is similarly modified such that its surfaces 87 and 88 respectively hold the internal and external bar code labels. Outwardly-opening gripper-slots 76 are formed in cartridge 22. Both sets of gripper-slots 75 and 76 may be molded in cartridges 22 and 24.

Figure 35A:
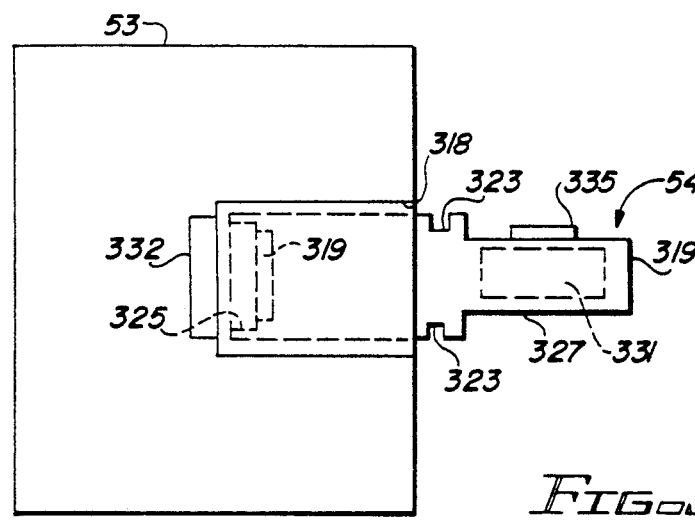
FIGS. 35, 35A, and 36 illustrate bar code reading and control communication systems usable with the traveling elevators in the FIG. 1 illustrated apparatus.

A battery-operated bar code reader or wand 54 is removably stored at each end of the transporter area, as in storage-charging unit 53 (FIG. 35A). Control 30 commands picker 33 to access the bar code reader (wand) 54. Picker 33 accesses the wand 54, inserts same into a receptacle (later described) for being moved to read bar code labels and to transmit, as later described, the read bar coded signals to IR transceiver 40. Control 30 commands wand 54, via the IR transceiver 40, to read bar codes at certain receptacles, such as the bin bar code followed by the bar codes of the cartridges in such bin.

One or more operator panels 50 are provided on the cabinets housing the devices 20-21A. Panel 50 for cabinet 14 is not shown in FIGS. 2 and 3. Such panels are for manual control of the devices and maintenance of the subsystem. Device controllers for the devices 20-21A may be packaged as a part of the devices or may be circuit cards mounted in the respective cabinets in areas 51.

Each of the cabinets have access doors 55 for inserting and removing cartridge bins (cartridge ingress and egress) as will become apparent. All other panels on the cabinets 12-15 are removable for accessing the devices and other components for maintenance, upgrading, removable and the like. It is to be understood that doors 55 may also cover devices in addition to bin receptacles 16.

Also in accordance with the present invention, a cartridge input-output (IO) bin is provided in predetermined one(s) of the receptacles 16. Such IO bin may have one or more input slots for each media type and one or more output slot(s) for each media type, an input-output slot for each media type and the like. If plural media types have identical exterior cartridge configuartions, than such plural media types may either share IO slots or have specific slots assigned to each media type. FIG. 3 shows a receptacle 16-IO containing an IO bin having a plurality of input and output slots 104-IO. The IO bin may be constructed as shown in FIG. 33 which is insertable into a receptacle 16-IO (See FIG. 34). Each cartridge slot 104 has a cartridge present/absent sensor 103, as later described with respect to FIGS. 18, 33 and 34. Each library subsystem 10 has one or more receptacles 16-IO. A suitable IO access aperture is provided in door 55 that is aligned with each receptacle 16-IO. Insertion or removal of a cartridge into an input slot 104-IO actuates a later described cartridge sensor 103 (FIGS. 18 and 33) to signal control 30 that a cartridge is either being inserted or removed, respectively. Preferably, removing a cartridge from subsystem 10 (FIG. 28) requires a host processor 11 or panel 50 command to control 30. Control 30 responds to the ejection command to move the command identified cartridge to the output or egress slot 104-IO. Then an operator manually removes the ejected cartridge from this slot.

Figure 4:
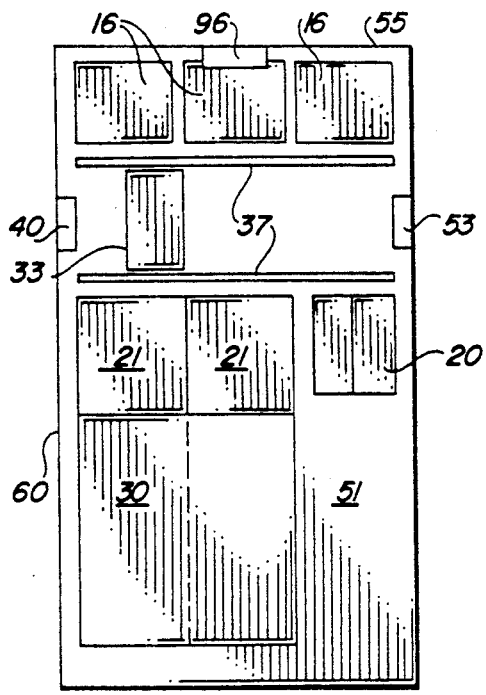
FIGS. 4 and 5 diagrammatically show internal construction layout of a single cabinet (FIG. 10 shows a single-sized cabinet for housing this apparatus.) implementation of the invention respectively in plan and elevational views.
Figure 5:
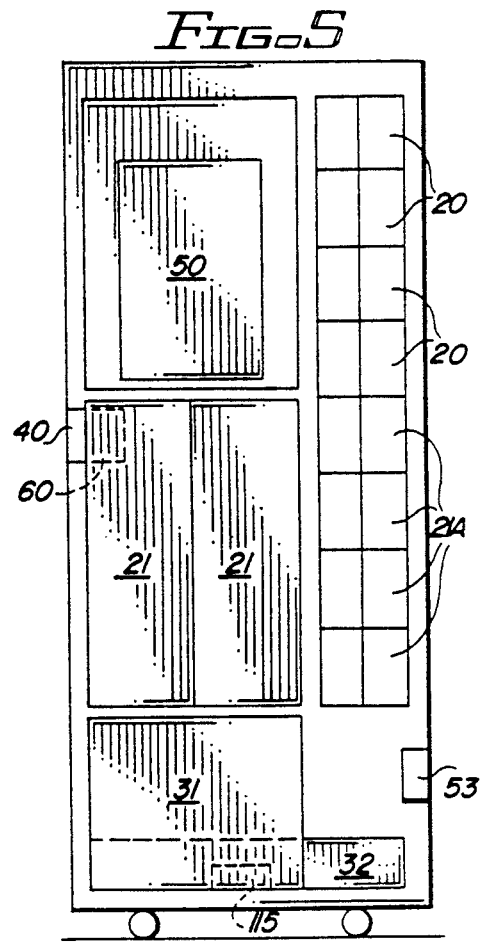

FIGS. 4 and 5 illustrate a one cabinet data storage subsystem 60 respectively in diagrammatic plan and elevational views. The arrangement is generally like the arrangement of cabinet 12 of FIGS. 1-3. A single picker 33 on rails 37, IR transceiver 40 and bar code wand reader 53 constitute the cartridge transporting apparatus. All other items are as described for cabinet 12.

Figure 6:
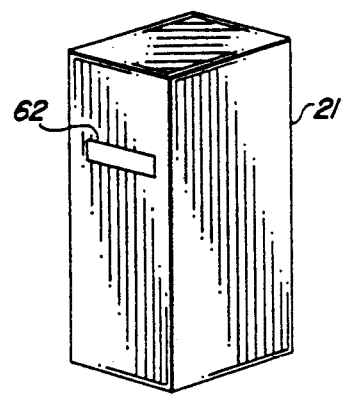
FIGS. 6 through 8 show three different media devices used in the FIG. 1 illustrated apparatus.
Figure 7:
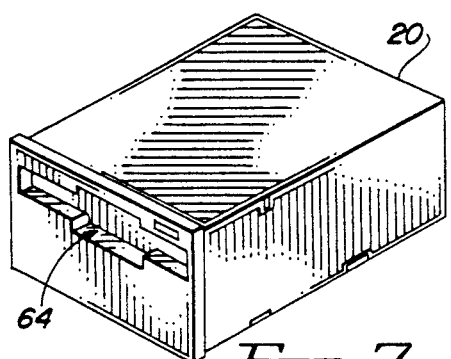
Figure 8:
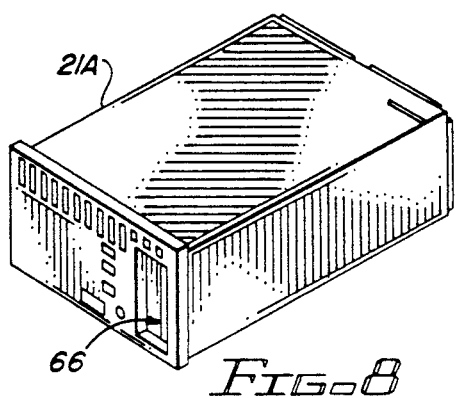
Figures 15A, 15B:
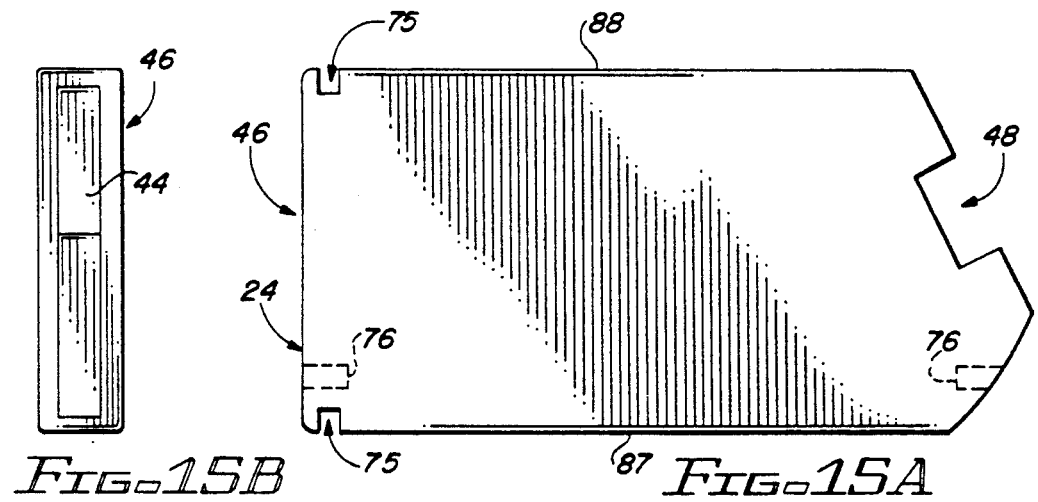

FIGS. 6-8 illustrate three media devices which respectively operate with diverse media configurations. Magnetic tape device 21 receives a cartridge 23 in receiving slot which leads to a cartridge receiver of a tape recorder (not shown) in device 21, such as an IBM 3490 tape drive. Similarly, FIG. 7 illustrates device 20 which receives an optical disk containing cartridge 22 in slot 64 which leads to a cartridge receiver of known design (not shown). The receiver carries the cartridge 22 into a play position of device 20. The width of slot 64 is sufficient for receiving a 3.5 inch cartridge 22. Optical disk devices (not shown) designed for operating with diverse diameter optical disks may also be used. Likewise, FIG. 8 illustrates a second magnetic tape drive 21A having a vertical slot 66 for receiving a cartridge 24 (FIG. 15A). Slot 66 leads into a cartridge receiver of a tape drive (not shown) which operates with cartridge 24 but not with tape cartridge 23. Therefore, it has been shown that at least three diverse media devices are incorporated into the multi-media data-storing library subsystems shown in this application.

Figure 9:
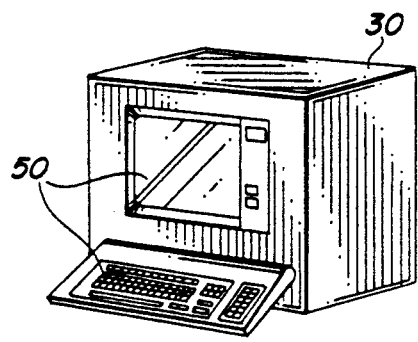
FIG. 9 illustrates a combined peripheral controller and operator panel arrangement.

FIG. 9 shows a control 30 having an operator panel on one side. This packaging is used in the FIGS. 1-3 illustrated embodiment of the invention.

Figure 10:
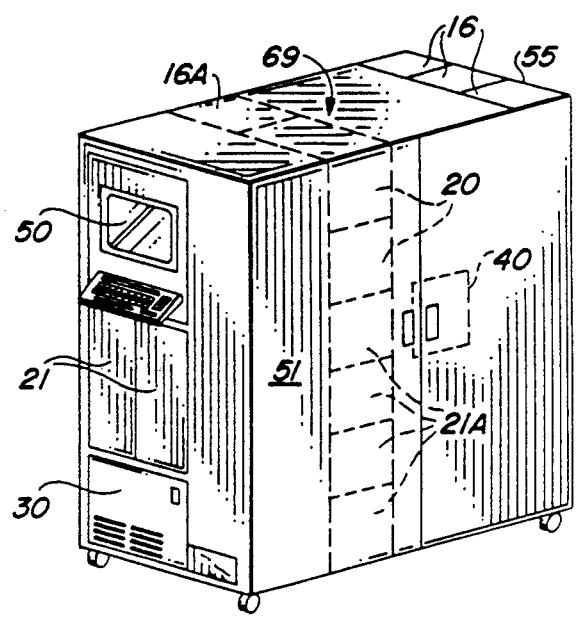
FIG. 10 illustrates a single cabinet library subsystem in a single full-sized or double-sized cabinet.

FIG. 10 diagrammatically illustrates a full-sized cabinet subsystem 68 similar to the cabinet 12 arrangement of FIG. 2. Cartridge transporting system is in area 69. Cartridge bin receiving receptacles 16 are disposed along one end wall which has openable door 55 for enabling insertion and removal of cartridge containing bins. Area 69 is adjacent the media devices 20 and over the media devices 21. Area 51 contains the circuit boards constituting the device controllers. The bin receptacles 16A are not accessible from outside the cabinet; therefore, receptacles 16A constitute permanent bin emplacements determined at the time of manufacture. Of course, a cabinet rebuild may be used to replace the bins in receptacles 16A. This arrangement shows that the modular construction enabled by receptacles 16 and the cartridge bins may include replaceable and permanent bin installations.

Figure 11:
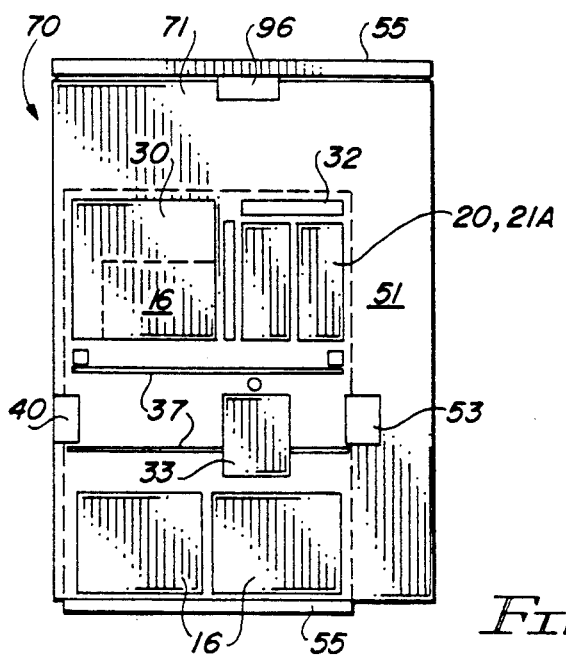
FIGS. 11 and 12 show, respectively in diagrammatic plan and elevational views, a so-called single cabinet apparatus using the present invention and the cabinet illustrated in FIG. 10.
Figure 12:
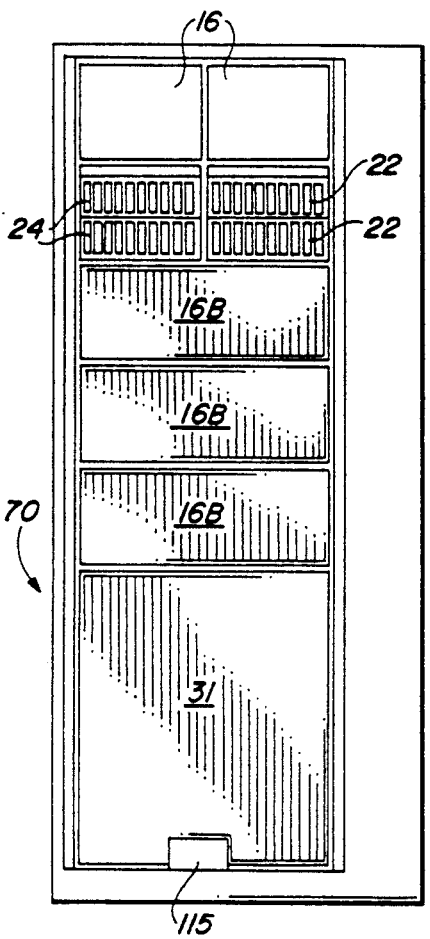

FIGS. 11 and 12 illustrate another single cabinet 70 arrangement of the subsystem. A stack of media devices 20 and 21A is to the right, as seen in FIG. 11, of control 30 (no operator panel is used in this embodiment) and a short column of receptacles 16. The short column is accessed via the door 55 at end 71 of cabinet 70. Cartridge types 22 and 24 are used, as seen in FIG. 12. Numerals 16B indicate double-width receptacles which accommodate cartridge receiving bins having a width twice that of cartridge holding bins 26 and 27.

Figure 13:
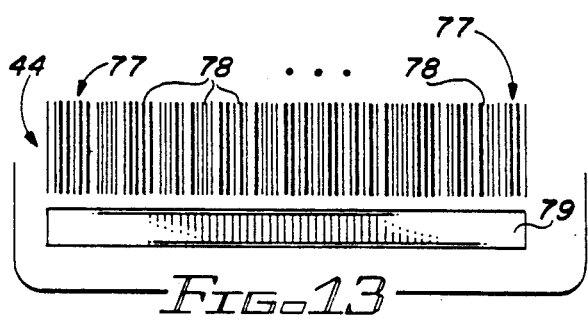
FIG. 13 illustrates an alphanumeric bar code format usable with the present invention.

FIG. 13 shows an alpha-numeric bar code label usable to identify cartridge holding bins 26 and 27 as well as cartridges 22-24. Numeral 77 indicates the usual end bar coding while numeral 78 indicates the alpha-numeric containing bar code characters. Standard bar code coding may be employed. As stated above, such coding can include a volume serial (VOLSER) number, job reference number, and the like. The identifications are selected based upon applications of the invention which are beyond the scope of the present disclosure.

Figure 16:
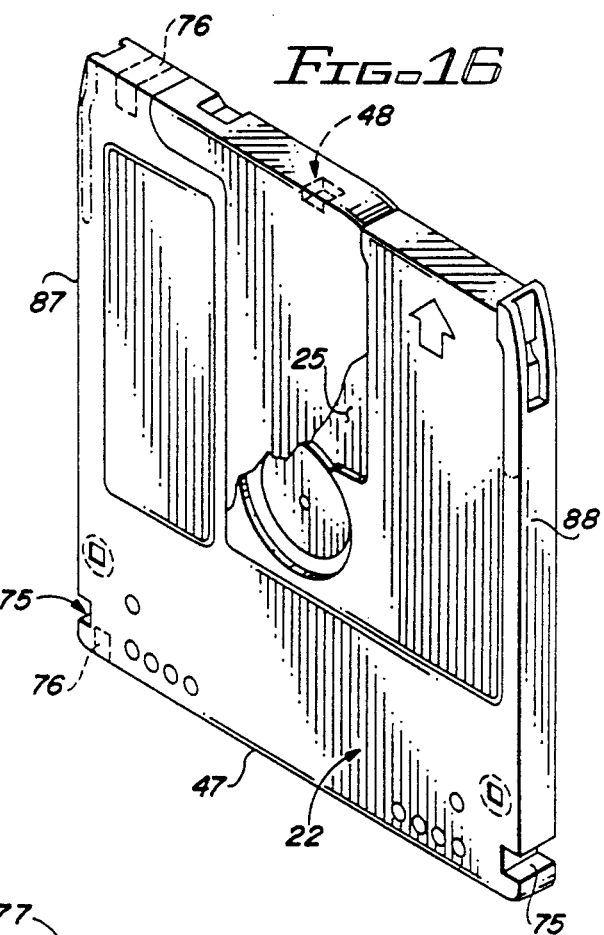
FIGS. 14A, 14B, 15A, 15B and 16 illustrate diverse media cartridge types usable in the FIG. 1 illustrated apparatus.

FIGS. 14-16 illustrate three different media cartridges used in the illustrated embodiment. All cartridges preferably include outwardly-opening cartridge-gripper slots 75 which cooperate with the picker 33 later described gripper for transportation between a cartridge bin and an appropriate one of the media devices 20-21A. The bar code label 44 is preferably located in a recessed area on surfaces 45, 46 or 47 on the respective cartridges. As described above, two identical bar code labels are preferably affixed to each cartridge. Among other things, each cartridge has an access opening at 48 which enables the respective media devices to access media in the cartridges in a known manner. The other items regarding the cartridges are not pertinent to an understanding of the present invention.

Figure 17:
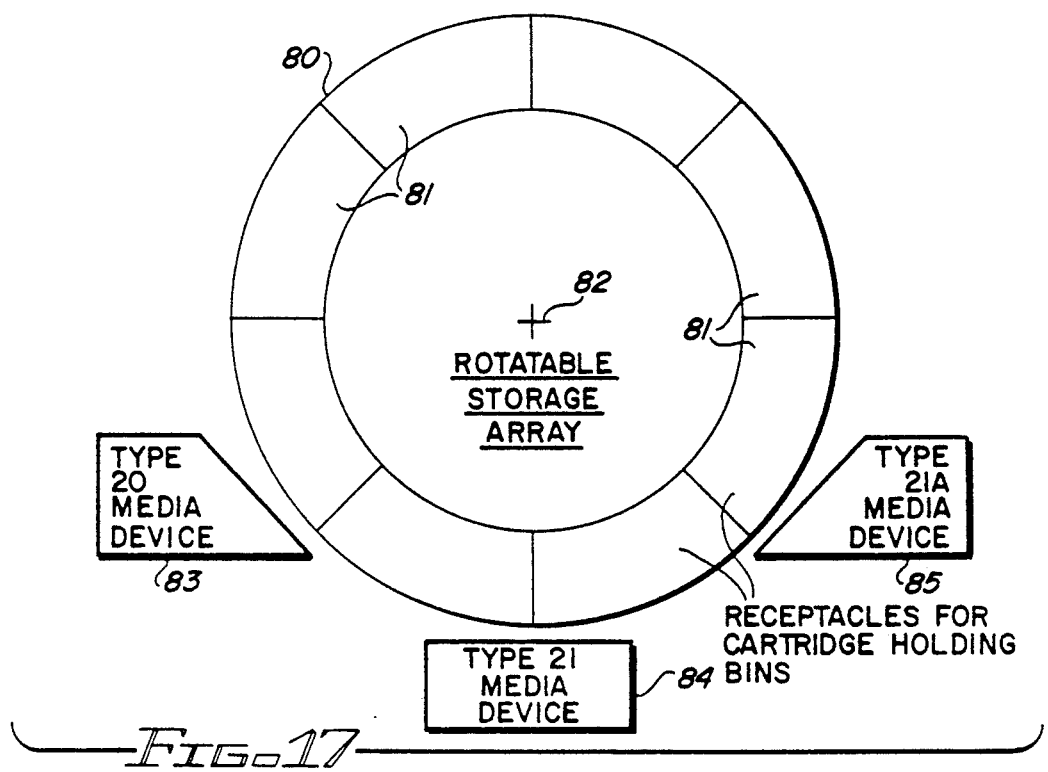
FIG. 17 illustrates a tubular implementation of the present invention.

FIG. 17 shows a multi-media data-storage subsystem having a rotatable tubular shaped storage array 80. Array 80 includes a plurality of cartridge holding bin receptacles 81, each of the receptacles 81 in FIG. 17 represent an axially extending column of such receptacles. Array 80 is rotated about axis 82 by a usual motor (not shown). Access to the bins in the receptacles is controlled as later described with respect to control 30 of subsystem 10. Access control doors (not shown) similar to doors 55 may be used. The three media devices 83-85 located at the outer radial periphery of array 30 respectively are the types 20-21A media devices as indicated on the drawing. Accessing a cartridge requires rotating the array 80 to position the cartridge at the appropriate device 83-85 using known servo positioning techniques and apparatus. The gripper (not shown) in each of the devices accommodate the cartridges 22-24 as described above.

FIGS. 18-32 illustrate control 30 and operations for implementing the present invention to provide a multimedia data-storing peripheral library subsystem 10 including single or multiple cabinet configurations. Microprocessor 90 is the heart of control 30. Microprocessor 90 executes microcode (shown by the machine operations charts in FIGS. 24-32) for effecting the machine operations shown in FIGS. 24-32 using the data structures shown in FIGS. 19-22. FIGS. 24-32 include manual operations which are monitored and limited by the microprocessor 90 controlled machine operations for ensuring integrity of subsystem 10. Operator panel(s) 50 are connected to microprocessor 90 for retrieving status information, instituting diagnostics and for inputting control information, configuration information and the like. Controller adaptor 91 provides a communication link between microprocessor 90 and host processor(s) 11 over cable 92. This communication link may be the IBM host to controller connections, a serial RS-232 link and the like.

Control of manual access to the cartridge bin receptacle(s) 16 is microprocessor 90 controlled. Receptacle 16-IO has received an IO bin 26/27 as later described and is accessible via a small door as will be come apparent. Cartridge transfers via receptacle 16-IO is microprocessor monitored and sequenced. The integrity controls for receptacle 16-IO may be less stringent than for manual access to other receptacles that are accessed only by opening a door 55. Door lock control 94 is connected to all door locks 96 (FIGS. 1, 4, 11) for the respective doors 55 via control lines 95. All doors 55 remained locked until unlocked by microprocessor 90. In this regard, a door open request, such as for removing or inserting a bin/cartridge into a given receptacle 16, is generated either by host processor 11 or operator panel 50. Such door open request may be restricted to host processor 11 during predetermined periods of time, i.e. during normal data processing periods. During normal or host processor 11 designated maintenance periods, operator panel 50 may be enabled for controlling door locks 96.

Figure 34:
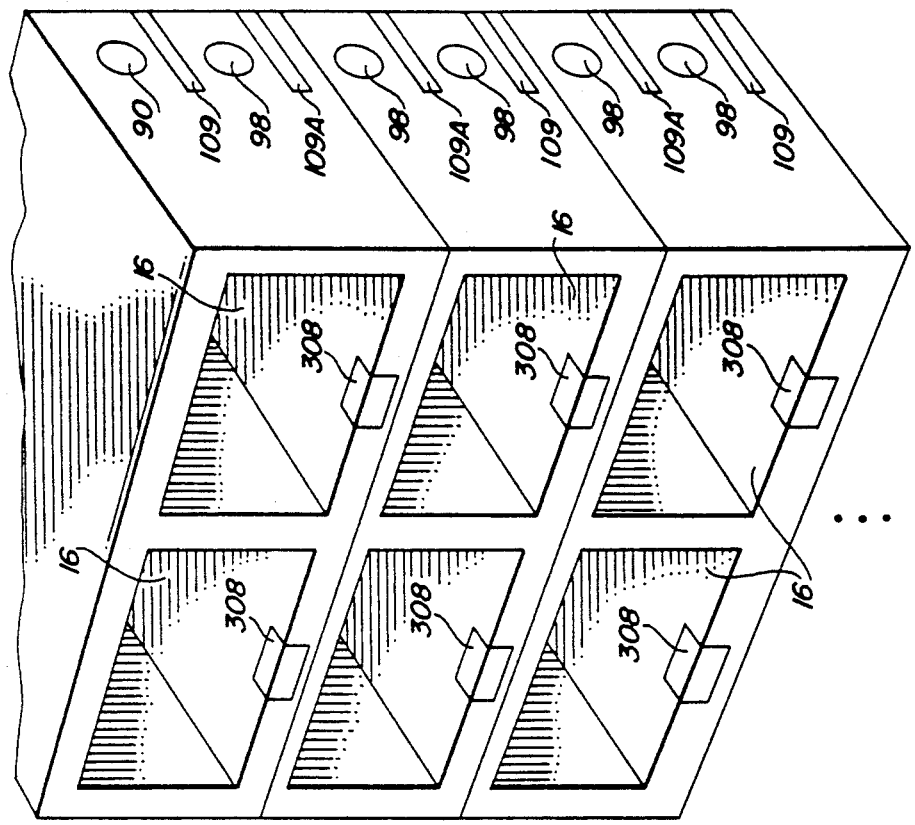
FIG. 34 shows sensor arrangements for bin receiving arrays used in the FIG. 1 illustrated apparatus.

Insertion, removal, presence or absence of a bin 26 or 27 into, from or in each receptacle 16 is detected and indicated by a respective bin sensor 98 (FIGS. 18 and 34). Each bin sensor 98 supplies a status signal over cable 97 to be received and stored in register REG 99. Microprocessor 90 reads REG 99 to obtain the current status of each receptacle 16, i.e. whether or not a cartridge holding bin is inserted in such receptacle. Such sensors may be mechanically actuated switches, i.e. a switch is closed by insertion of a cartridge 20-21A completely into a bin 26/27. Magnetic cartridge marker magnets 105 (FIG. 33) may be inserted in each bin for magnetically closing a sensor switch 98 in the bins for indicating presence of a cartridge in one of the bin slots 104. Also, a metal plate may be inserted on each bin as a bin marker which completes an electrical circuit for indicating presence of a bin in a receptacle. Numeral 105 also indicates location of the metal plate bin marker. The marker is positioned on the bin such that bin sensor 98 only when the bin is completely inserted into a receptacle 16. Usual retaining detents (not shown) may be employed for anchoring a bin in a receptacle 16.

REG 99 is constructed to include a status change detector 100 which detects any change in bin status. Change detector 100 is connected to all input lines to REG 99 from bin sensors 98 via a logic OR circuit (not shown). A differentiator (not shown) receives the output of the OR circuit and generates a signal for each change of status. Detector 100 then interrupts microprocessor 90 in a usual manner. Microprocessor 90 responds as later described.

Most of the bins 26/27 have no cartridge present sensors. Each IO bin and each bin designated as a security bin have cartridge sensors. Each receptacle which is to receive a security bin includes the later described electrical connections. Other receptacles 16 that are neither IO nor security have only the bin sensing electrical connections. Each bin 26/27, designated as being either an IO or security bin, contains a plurality cartridge present sensors 103 (FIGS. 18 and 33). Such cartridge present sensors may be constructed as described for bin present sensors 98. When the entire library or cabinet is designated as having only security receptacles, then the large number of cartridge present sensors 103 are preferably multiplexed to a common bus 106 by multiplexor MPX 107. Otherwise, MPX 107 may be dispensed with. Cartridge sensors in the bins (preferably other than any IO bin) can be connected to a single line such that a change in cartridge present or absent state results in a signal being sent to the control means 30. Such change in state signal only indicates that any one of the cartridge receiving slots has either recieved a cartridge or has had a cartrdige removed. In this latter arrangement, the bin either recieving or yieldeing a cartridge from or to the cartridge carrier or picker 33 verifies the retrival or storage function. If a change signal is recieved when the transport system 17 is not accessing a slot in a bin sending a change signal indicates a need for a bin audit. Such audit is effected by bar code reading as will become apparent.

Numeral 108 collectively denotes the individual bus from each of the sensors 103 in bins 26/27 Each individual bus is completed when a bin is inserted into a receptacle by electrical contacts 109 (FIGS. 33 and 34). In stacked bins, i.e. two bins 26 stacked to fill one receptacle, the lower bin 26 includes electrical conductors (not shown) to complete an electrical circuit for each sensor 103 in an upper bin to mating electrical contacts 109A in the receptacles. The cartridge sensors 103 multiplexed with the input-output cartridge sensors in slots 104-IO in bin 16-IO. Cartridge sensors 103 are always used in bin(s) 16-IO slots 104-IO. For cost control, the cartridge sensors in all of the bins 26/27 are dispensed with. As an alternate, designated ones of the receptacles 16 are designated for bins carrying cartridges containing critical or sensitive data requiring a security control in library subsystem 10. Such security designated receptacles have electrical connections for connecting to security designated ones of the bins 26/27. The security designated bins have cartridge sensors 103. The number of such security designated bins is selected based upon the security requirements of the installation. At a minimum, cartridge sensors are used in the bin 104-IO such that all receptacles that are not designated as an input-output receptacle do not include cartridge sensors.

Microprocessor 90 selects which of the receptacles 16 is to have its received cartridges indicated to microprocessor 90 by actuating MPX 107 to connect one of the cables 108 to common bus 106. Common bus 106 is connected to register REG 112 for supplying the cartridge present signals thereto for storage. Change detector 113 in REG 112 is constructed as described for change detector 100. If it is desired to have a continuous monitoring of all cartridges in subsystem 10, then MPX 107 is dispensed with and a separate register is provided for each of the receptacles 16. Each of the registers 112 includes a change detector 113.

The open-closed status of doors 55 is sensed and indicated by door sensors 115 (FIGS. 2, 5, 12 and 18). Such door sensors are preferably magnetic switches actuated to be closed when the doors 55 are respectively closed. Fail safe operation may be provided by dual sets of contacts, one set having closed contacts and a second set having open contacts when the respective door 55 is closed. An EXCLUSIVE OR circuit verifies proper operation. Door sensors 115 are connect by cable 116 (one conductor of cable 116 is connected respectively to one of the sensors 115) to respective digit positions of register REG 117. Change detector 118 of REG 117 is constructed as described for change detector 100. Cable 120 connects REG 117 and change detector 118 to microprocessor 90.

Microprocessor 90 also controls cartridge transfers by picker 33. Picker control 123 communicates with microprocessor 90 in a usual manner. Picker control 123 responds to microprocessor 90 commands to move picker to a given receptacle 16 or media device 20-21A by sending move commands to picker 33 via cable 124 and IR transceiver 40 or 41. Whether to pick a cartridge from a bin slot 104 or from a media device 20-21A is also commanded to picker 33 via IR transceiver 40 or 41. Picker 33 status, cartridge not found and other status information are also communicated from picker 33 via IR transceiver 40 (41) via picker control 123 to microprocessor 90.

Figure 35:
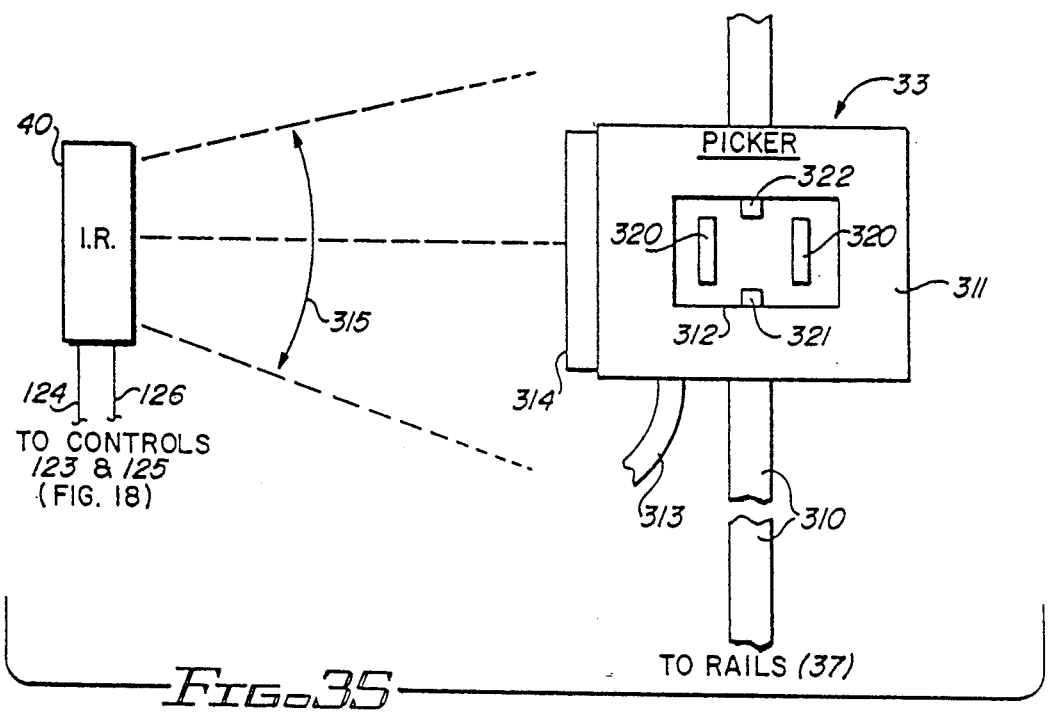

Similarly, bar code reading wand 54 (FIG. 36) is controlled by microprocessor 90 via wand control 125. Wand control 125 communicates with wand 54 via cable 126 to IR transceiver 40, thence by radiation to IR transceiver 335 (FIGS. 35 and 36) on wand 54. The sequence of operations for effecting wand 54 activity is for microprocessor 90 to actuate picker 33 via picker control 123 to access wand 54 from its storage location 53. Then picker 33 travels to the appropriate receptacle 16 for reading either the bin bar code or the cartridge bar codes. Such reading is commanded by wand control 125. Control 125 processes the read bar code signals in a usual manner and supplies the read bar code values to microprocessor 90.

It is desired to monitor removal of bins or cartridges during power off conditions. During such conditions, microprocessor 90 is inactive such that any physical changes in the library are not detected. Sensor microprocessor 130 is continuously powered on by battery 131 for continually monitoring sensors 98, 103 and 115. The changes in status of the sensors detected by microprocessor 130 during power off situations are detected and stored in retentive store 132. Microprocessor 90 communicates over cable 134 with retentive store 132. The usual power supply 135 supplies power over power bus 136, 137 to all components of control 30. This supply includes charging battery 131 and operating sensor microprocessor 130. Upon each power off, microprocessor 130 logs the time into retentive store 132. Retentive store can be one that does not require continuous battery power for retaining information stored therein, i.e. EPROM etc. Upon each power on, microprocessor 90 examines retentive store 132 for fetching all logged bin and cartridge sensor signals captured by microprocessor 130. Upon reading any logged bin or cartridge removals, microprocessor 90 performs a bar code read of all reported bin removals, including all cartridges originally in the bins removed during power off. The read bar codes are then compared with the bar code values in cartridge table 154 (FIG. 21). Any differences are noted. Control 30 treats all cartridges as newly inserted cartridges. Control 30 then effects the machine operations shown in FIG. 26. Control 30 logs all matches of bar code values (bins and cartridges) and VOLSER's in RAM 133. Upon completing the audit, all audit information is supplied to host processor 11 and to the operator via panel 50.

The data structures shown in FIGS. 19-22 are always stored in retentive store 132. Other data structures (not shown) and temporary status data are stored in volatile random access memory RAM 133. Microprocessor 90 has exclusive use of RAM 133 and shares access to retentive store (battery powered RAM) 132 with sensor microprocessor 130. All updating of retentive store 132 is performed by sensor microprocessor 130. Microprocessor 90 has read only access to this store.

The system 10 data structures for practicing the present invention are diagrammatically shown in FIGS. 19-22. Device table 140 (FIG. 19) includes address field indicating the physical address of the device in system 10, i.e. the address of the respective cartridge access slot(s) for the device. For example, the address for each device 21 (FIG. 6) is the location of its respective cartridge access slot 62. Other devices are addressed in a like manner. Field 142 contains media type identification data useable by the identified device, i.e. magnetic tape, optical disk, etc. Field 143 contains unique physical parameter data, i.e. read only (player not recorder), read and write, etc. Field 144 stores logical parameter data, such as capacities, formats that can be read or written to, etc. Each device in subsystem 10 has one entry in device table 140, ellipsis 145 indicates a plurality of such entries equal to the number of devices.

Slot offset table 148 indicates the physical offset values of slots in a bin for each of the receptacles. There is one entry for each receptacle in subsystem 10. Field ADDRESS 149 stores a reference physical address (so-called X-Y address location in the storage rack array of the cabinets) of each receptacle 16, i.e. the upper leftmost slot position for example. Left wall 151 of the leftmost slot 104 of bin 27 (FIG. 33) is a reference slot location. The physical address of the left wall of 151 is the reference physical address of the receptacle 16. In the case of two deck bins in one receptacle, the upper leftmost slot is the reference slot. Field 150 "slot-to-address-change" contains the width of each slot in the bin residing in the receptacle. This width value is the physical offset value for every slot in the bin identified in ADDRESS field 149. Microprocessor 90 calculates the physical address of the third slot 104 from the left by adding the reference address (field 149 stored value) to three times the value stored in field 150.

FIG. 21 shows the layout of cartridge table 154 that identifies all cartridge positions in library subsystem 10. The number of entries for each receptacle location is the maximum number of cartridges storable in one receptacle. Many bins inserted into a receptacle store fewer than the maximum number of possible cartridges. Cartridge table 154 identifies all used slots, reserved slots, open slots and all slots not existing in an insert bin (vacant slot positions). FIG. 21 shows "N" slot numbers for every bin (receptacle location) in column BIN SLOT NUMBER 155. Double headed arrow 162 signifies the maximum number of slot positions as being from one to N. N can be any integer. For each cartridge stored in the subsystem the cartridge volume serial number (VOLSER) is stored in column VOLSER 156. To enable rapid location of cartridges by VOLSER's, pointer fields in column POINTERS 157 store an ordered list of VOLSER's. Using pointer fields enables reordering the pointer fields to create a table listing in microprocessor 90 or host processor 11 for minimizing search times. Column BAR CODE 158 stores the bar code value of each cartridge stored in the subsystem. POINTER column 160 is an ordered list of pointers for identifying cartridges by bar code values. Again, sorting the bar code values to generate the pointers provides for rapidly accessing cartridge using bar code values. Column STATUS 160 stores the status of each bin slot number entry. The status of the entries is indicated by values A, R, E, 0 or V. "A" status (affinity-occupied) means the slot is occupied by a cartridge which is a member of a later described affinity group of cartridges. The status includes an identification of the cartridge's affinity group. Any bin 26/27 may include cartridges from one or more affinity groups. Likewise, one affinity group may include cartridges in more than one bin 26/27. One affinity group may include cartridges of any type(s) of media in the subystem 10. Status "R" (reserved-affinity) indicates that the slot is empty but is reserved to be used by cartridges assigned to an affinity group. The R status may include parameter data identifying the affinity group. The R status applies to any media type or a combination of media types. "E" status (empty) means that the slot is empty and can be used by any cartridge of any media type that is not a member of an affinity group of cartridges. "O" status (occupied) means the slot is storing an cartridge which is not a member of any affinity group. "V" status (vacant) means that no physical slot is present for the slot entry, i.e. the entry is vacant. In column STATUS 160 the values A-XY, A-CD and A-BC respectively indicate cartridges that are members of affinity groups XY, CD and BC. When a bin has slots with the A or R status, the bin is termed an affinity bin. Any bin NOT having any A or R status, is termed a "free" bin. These status are significant as will become apparent when bins are inserted into or removed from subsystem 10. FIG. 21 shows "K" bins numbered from bin 1 through bin K. Column 161 stores the bin bar code values for the respective bins; the value is stored in each of the cartridge entries.

FIG. 23 illustrates a thirteen slot bin 170. Assuming library subsystem 10 provides for a maximum of twenty cartridges per bin (N=20), the thirteen slot bin 170 is represented in cartridge table 154 column 155 as having cartridge slots 14-20 with a status "V" in column STATUS 160, i.e. are not existent. Slots 1-13 have one of the status A, R, E or O in column STATUS 160. As shown, slots 1-6 have A status, slots 7-10 have R status, slot 11 has E status while slots 12 and 13 have 0 status. Slots 1-10 are for cartridges which are members of an affinity group(s), such as group XY. Bins inserted into receptacles having an address greater than unity, the subsystem slot numbers for such bins are the products of bin number K times the slot number within each bin.

Figure 24:
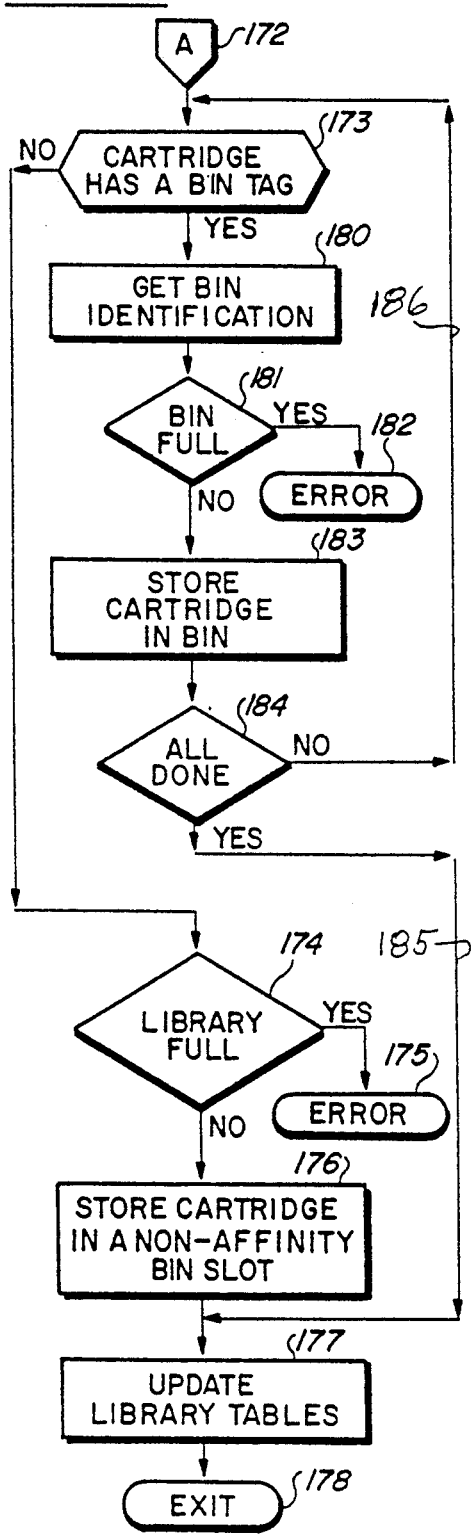

The manual and machine operations illustrating practicing the present invention in subsystem 10 are next described. First described is the analysis procedure of microprocessor 90 performed before inserting any cartridge into any slot 104. These machine operations conclude several cartridge related machine operations that generated data used in the FIG. 24 illustrated operations. Entry into the FIG. 24 illustrated operations is at off page connector 172. Machine step 172 analyzes the data (later described) associated with moving a cartridge. Such data are stored in RAM 133. These data include whether the cartridge is identified in cartridge table 154, i.e. has a bin "tag". If the cartridge is not identified in cartridge table 154 (the cartridge is a newly inserted cartridge), then machine operation 174 determines whether the subsystem library is full. This determination can include scanning cartridge table 154 for slots having "E" status for non-affinity cartridges. If the cartridge is designated as an affinity cartridge, it has a software tag in its VTOC indentifing its affinity group. For such an affinity cartridge, later described steps find an "R" status slot for storing the cartridge. If the library is full, then an error is reported over machine operation path 175. Recovery from this error is beyond the scope of the present description. Machine operation 174 in determining that library subsystem 10 is not full, results in machine step 176 storing the cartridge in a non-affinity slot 104. Machine operation 176 includes finding a slot 104 having no affinity and storing the cartridge in that slot. Once the cartridge is stored, microprocessor 90 in machine operation 177 updates cartridge table 154 to reflect the assignment and storage of the cartridge. The FIG. 24 illustrated operations occur when the cartridge being handled is in a media device. Therefore, for storing this cartridge in a non-affinity or "E" status slot, microprocessor 90 commands picker 33 to fetch cartridge from the media device. Then, picker 33 carries the cartridge to the selected "E" status slot 104.

In machine operation 173, any bin tag results in microprocessor 90 in machine operation 180 obtaining the bin identification (address) for the cartridge. This operation requires scanning cartridge table 154 to identify a slot 104 for storing the cartridge. If the cartridge was previously stored in the subsystem, then searching for the VOLSER by scanning the pointers in column 157 quickly finds the slot address. If the cartridge is newly introduced into subsystem 10 with an affinity tag, then microprocessor 90 scans column 160 for an "R" status slot 104 bearing an identification of the cartridge affinity group or class. In a large capacity subsystem, a separate affinity table (not shown) stores identifications of all affinity groups or classes and affinity bin identifications. In this latter arrangement, microprocessor 90 scans the affinity table to identify the bin(s) having slots designated for storing the affinity cartridge. Then, the appropriate "R" status slot 104 is obtained from cartridge table 154 by accessing the identified bin entries in column BIN SLOT NUMBER 155.

Once the slot 104 has been identified, then microprocessor 90 commands picker 33 to carry the cartridge to the slot. Machine operation 181 examines the result of the picker 33 attempting to store the cartridge in the identified slot. If the slot already has a cartridge, then an error occurred as indicated by numeral 182. Recovery from this error is beyond the scope of the present description. Normally the identified slot 104 is empty. Picker 33 then, at machine operation 183, under microprocessor 90 command, stores the cartridge into the identified slot 104. Machine operation 184 determines whether more cartridges are to be processed in this operation. Usually only one cartridge is processed at a time, therefore machine operations follow path 185 to machine operation 177. For multiple cartridge handling, machine operation follow path 186 to repeat machine operations 173, et seq.

Figure 25:
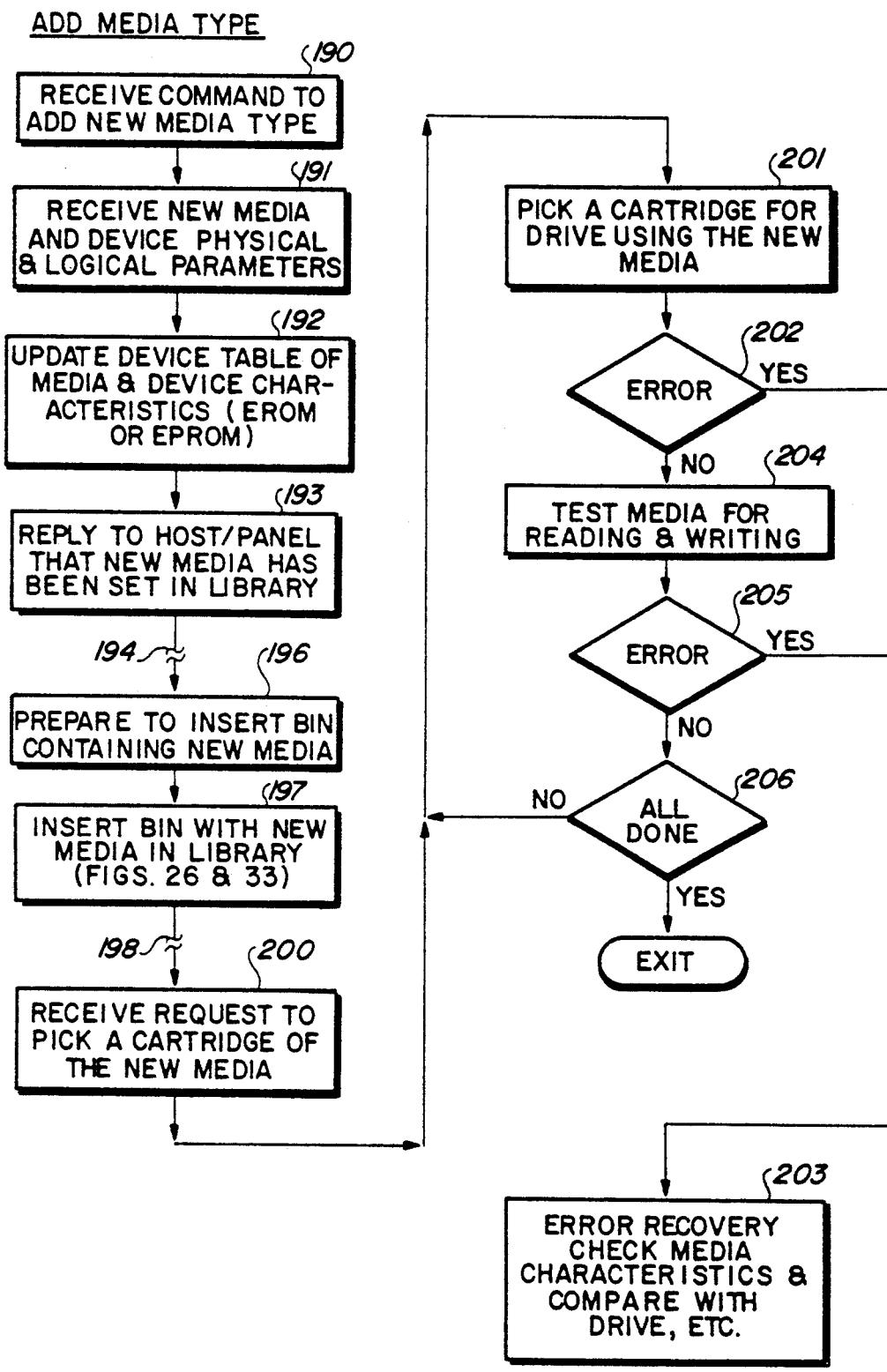

Upon either first establishing or modifying the subsystem 10 physical configuration, the FIG. 25 illustrated machine operations enter media type identifications into device table 140 of FIG. 19. Either host processor(s)11 or operator panel 50 (maintenance procedure) initiate and control the FIG. 25 machine operations. Before executing the FIG. 25 machine operations, a media device suitable for using the new media type is installed. Some media devices can operate with multiple media types, hence will be identified in multiple entries 145 of device table 140. In machine operation 190, microprocessor 90 receives a command from either host processor 11 or panel 50 to add a media type and possibly an associated new media device to subsystem 10. Machine operation 191 receives the parameter data for insertion into device table 140. These data include the addresses for field 141 of all the compatible media devices, parameter data defining the media type for field 142, the physical parameter data for field 143 and any logical parameter data for field 144. Machine operation 192 updates the device table 140 with the received parameter data. Device table 140 is stored in retentive store 132. Machine operation 193 replies to either or both panel 50 and host processor(s) that the new media type control data has been added to subsystem 10. Numeral 194 indicates a time break in completing the FIG. 24 operations.

Operations 196 and 197 insert some of the newly identified media into subsystem 10. Manual operation 196, outside of subsystem 10, inserts new media cartridges into a bin 26 or 27. Combined manual and machine operation 197 inserts the prepared bin of new media into a receptacle 16 as described with respect to FIG. 26. The bin containing the new media may be inserted into a bin containing cartridges of another media type that can be stored in slots of a partially occupied bin. It is preferred that each bin have media of one type. One example of mixed media having identical physical parameters are read-only optical disks, write-once optical disks and rewriteable (erasable) optical disks. Numeral 198 signifies a break in operations.

To complete the new media process, the new media is tested in a media device. In machine operation 200, control 30 receives a request, from either host processor 11 or a panel 50, to pick one of the new media type cartridges. Machine operation 201 picks the cartridges from its slot 104 and transfers the picked cartridge to a media device. Machine operation 202 detects any picking error, i.e. the new media type cartridge may not be pickable from its slot. Numeral 203 indicates error evaluation and recovery operations performed in response to the picking error. This operation is beyond the scope of the present disclosure. Usually there is no picking error, therefore in machine operation 204 the media device tests the new type media for desired operations, such as reading, writing, error checking and the like. Decision operation 205 evaluates the operation 204 test results. If error(s) occurred, then operations 203 are performed. Otherwise, machine operation 206 determines whether all cartridges designated to be picked have been tested. If yes, the FIG. 25 operations are exited. If the operation is not done, then the cartridge in the media device is stored in its designated slot 104. Then machine operations 201 et seq are repeated. The new media type cartridges may include cartridges having data recorded therein. It is preferred that the testing of machine operation 204 be performed on a so-called scratch cartridge (no data is stored in the cartridge except possibly test data).

Figure 26:
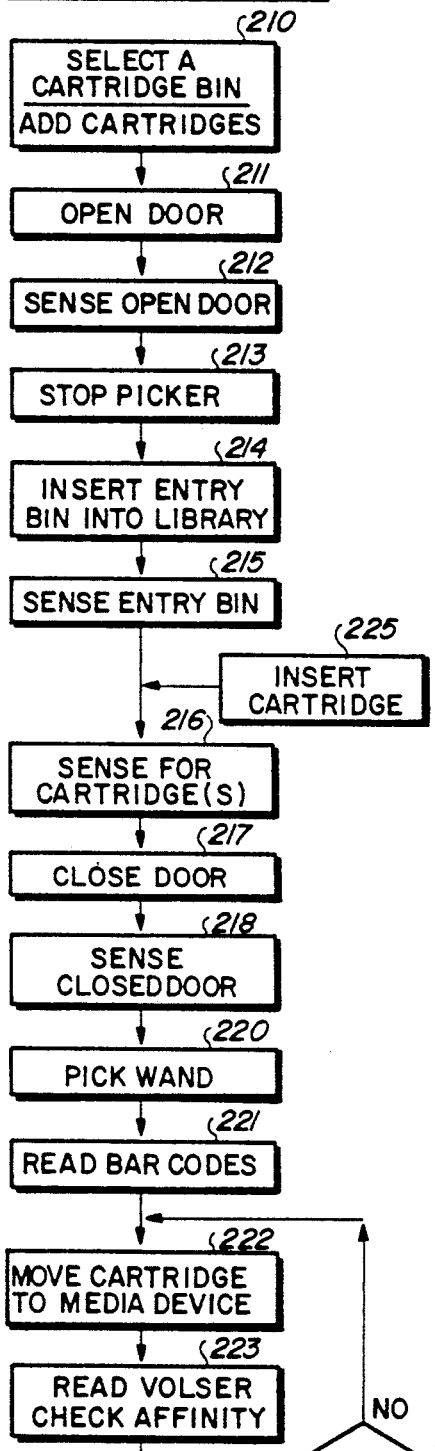

FIG. 26 illustrates inserting a cartridge holding bin into a receptacle 16. Manual operation 210 selects an empty cartridge bin. Cartridges are manually inserted into the selected bin. Beginning the open door operation 211, the operator notifies control 30 via panel 50 that a door 55 is desired to be opened. Control 30 unlocks the door and prepares to stop cartridge transporting operations. A door sensor 115 in machine operation 212 senses that a door 55 is open. This sensed door status actuates detector 118 to interrupt microprocessor 90 (control 30) that a door has been opened. REG 117 stores the status indicating which of the doors 55 is open. In machine operation 213, control 30 actuates picker 33 to stop its operations, at least in the cabinet 12-15 having the open door 55. In manual operation 214, the operator (not shown) inserts the selected bin into a desired receptacle 16. Such desired receptacle may have been empty or the bin being inserted replaces the current bin in the desired receptacle. For integrity purposes, the removal of bins is coordinated as will become apparent.

A bin sensor 98 senses and indicates the inserted bin. The senses status signal travelling over cable 97 actuates detector 100 to interrupt microprocessor 90 for reporting changed bin status and inserts the bin present status into REG 99. Substantially simultaneously to machine operation 216, the operator manually closes the open door 55. The door sensor 115 for the just-closed door 55 actuates detector 118 and inserts the close door status into REG 117. Microprocessor 90 responds to the interrupt to read REG 117 new status. Microprocessor 90 then resumes normal subsystem 10 operations relating to transporting cartridges.

Next, the bar code labels on the newly inserted bin and cartridges are read and stored in cartridge table 154. Control 30 in machine operation 220 commands picker 33 to retrieve (pick) bar code reading wand 54 from its storage location 53. Picker 33 in machine operation 221 uses bar code wand 54 to read the bar code labels of the newly inserted bin and cartridges. The read bar code values are sent to control 30 (via IR transceiver 40 or 41 and wand control 125) to be stored in RAM 133 until the current operation is completed. Upon completing the bar code reading, picker 33 returns the wand 54 to its storage location 40 or 41. Control 30 then, in machine operations 222-224, effects a serial transfer of all the newly inserted cartridges to an appropriate media device for reading the VOLSER's and checking affinity status of each of the cartridges (machine operation 223). The read VOLSER and affinity status are stored in RAM 133 until end of the cartridge insertion operation. Decision machine operation 224 checks whether all of the newly inserted cartridges have been checked in by the media device. If not, machine operations 222-224 are repeated. As soon as all of the cartridge VOLSER's and affinity status have been read, operations proceed to the FIG. 24 illustrated operations for updating cartridge table 154 in retentive store 132. Such updating includes transferring the RAM 133 stored data to retentive store 132 and resorting the pointers in columns 157 and 159 of device table 140.

Manual operation 225 inserts a single cartridge into receptacle 16-IO (FIG. 3) input slot 104-IO. Cartridge sensor 103 in the input slot 104-IO activates change detector 113 and inserts the input status into REG 112. Detector 113 interrupts microprocessor 90 for processing the cartridge insertion by effecting machine steps 220-224.

Figure 27:
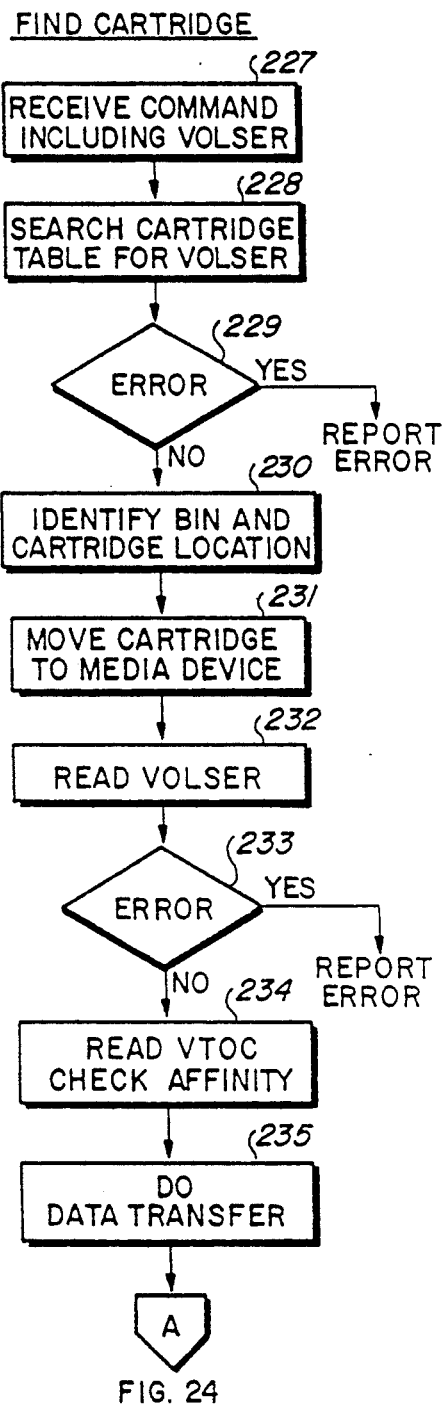

FIG. 27 illustrates finding a cartridge stored in subsystem 10. Machine operation 227 receives a new or load cartridge command from a host processor 11. This received command includes the VOLSER of the cartridge to be moved, loaded or removed from subsystem 10. The bar code is used to verify the VOLSER of an identified cartridge as corresponding to the command identified VOLSER. A volume is the media contents of one cartridge. By definition, one cartridge may contain more than one volume or be part of a volume set of cartridges. As soon as the data command is decoded, control 30 searches cartridge table 154 for the VOLSER. The pointers in column POINTERS 157 are used for expediting the VOLSER search. Once the requested VOLSER is found in column 156, decision operation 229 checks for errors. If there is an error, the error is reported to host processor 11 for its action and the received command is aborted. If there is no error, machine operation 230 reads the bin and slot number stored in column BIN SLOT NUMBER 155 for the identified VOLSER. Machine operation 231 then reads the "SLOT TO ADDR CHANGE" field 150 having the bin number field content 149 matching the selected bin number. The slot offset is combined with the slot number to calculate the actual physical "XY" address of the slot 104 storing the identified cartridge. Control 30 then actuates picker 33 to move the identified cartridge from the identified bin slot to a target media device identified via device table 140. The target media device in machine operation 232 reads the VOLSER of the identified cartridge. Machine step 233 compares the read VOLSER of the cartridge with the cartridge table 154 stored VOLSER value. If the read VOLSER value does not match the cartridge table 154 stored VOLSER a subsystem integrity problem is indicated requiring logging the error and reporting the error to host processor 11. Control 30 aborts the find operation. Assuming that the read VOLSER and cartridge table 154 stored VOLSER match, the cartridge volume table of contents (VTOC) (not shown) is read in a usual manner. The affinity status of the cartridge is checked against the cartridge table 154 stored affinity status. If there is a difference in the affinity status, that error is reported. Machine operation 235 then performs the host processor 11 commanded operation. Then the FIG. 24 illustrated operations are performed to update the subsystem 10 tables.

Figure 28:
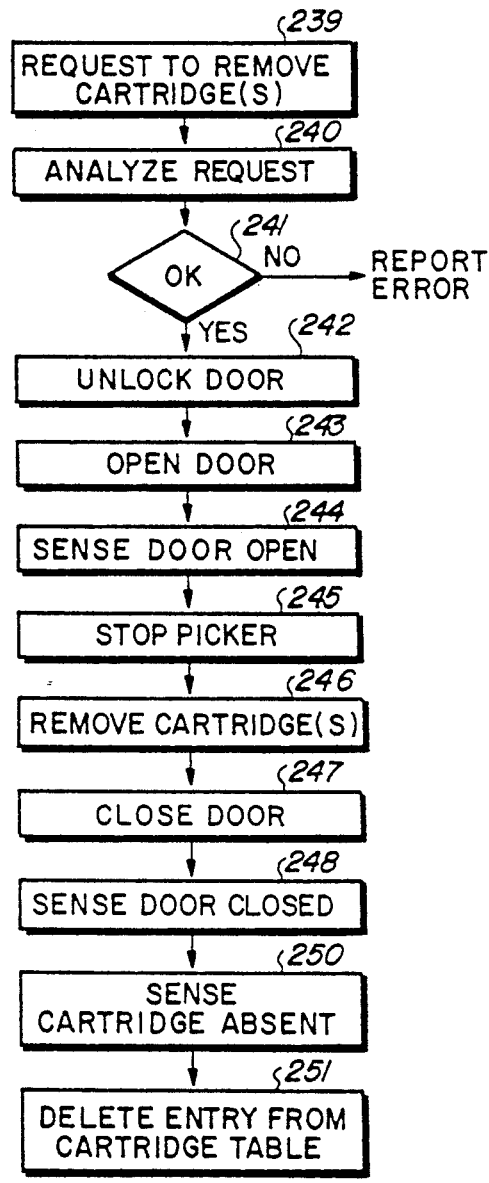

FIG. 28 illustrates removing cartridges from subsystem 10 either by removing a bin with the cartridges to be removed and replacing the bin or via input-output bin 16-IO. Control 30 in machine step 239 receives a host processor 11 request to remove one or more cartridges. Machine step 240 analyzes the request. Machine step 241 determines whether the request can be performed, if not an error is reported to host processor 11. Recovery from this error is beyond the scope of the present description. If the request can be performed, then control 30 unlocks the appropriate door 55. The operator opens the door. The sensor 115 for the opened door in machine step 244 senses the open door to actuate detector 118 and store the open door status in REG 117. In machine operation 245 control 30 stops picker 33 motions. The operator in machine step 246 removes the cartridges by removing the bin from its receptacle 16, then removing the cartridges from the bin and reinserting the bin into the same receptacle 16. The operator in manual operation 247 closes the door. Sensor 115 in machine step 248 senses that the door 55 is closed and signals microprocessor 90. Cartridge sensors 103 sense and report to microprocessor 90 that the slots 104 are now empty. Microprocessor 90 then deletes the cartridge entries from cartridge table 154.

If control 30 decides in machine steps 240 and 241 that the cartridge(s) are to be removed or ejected via the IO receptacle 16-IO, then control 30 omits operations 242 through 248. The omitted operations are replaced by control 30 commanding transport system 17 to move the cartridge(s) from their designated slots to receptacle 16-IO exit or output slot 104-IO. The operator (not shown) of subsystem 10 is alerted to the cartridge inserted into receptacle 16-IO. Also, at this point in time, the cartridge has been ejected causing control 30 to update cartridge table 154 in machine operation 251. Removing a plurality of cartridges requires removal of the cartridge from slot 104-IO before another cartridge is moved to that slot. A plurality of slots 104-IO may also be used.

Figure 29:
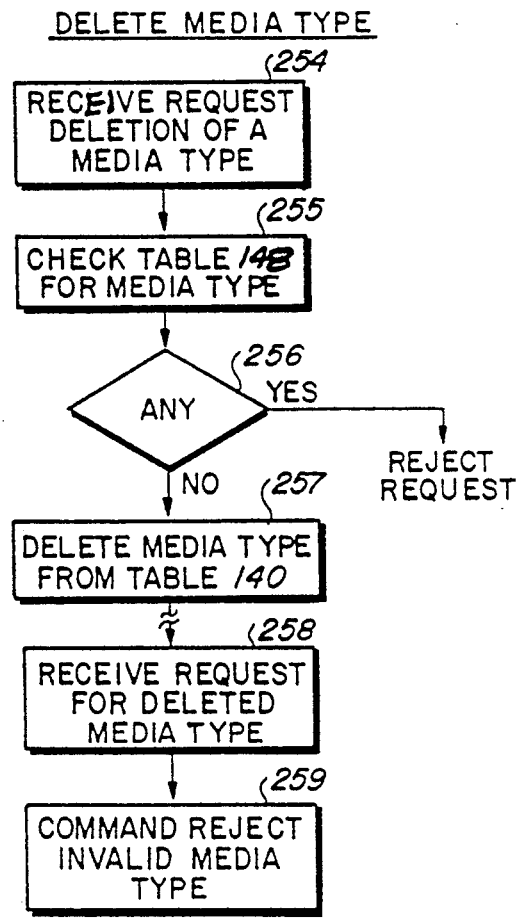

FIG. 29 illustrates deleting a media type from subsystem 10. This deletion does not necessarily mean that media devices ar removed and their entries deleted from device table 140. Control 30 receives a host processor request to delete an identified media type from subsystem 10. The received command is analyzed in machine operation 255. This analysis includes checking column STATUS 160 of cartridge table 154 for any cartridges of the requested media type. Such media type is a part of the status of each cartridge. If any cartridge is listed as being of the type to be deleted, machine operation 256 rejects the received command. The rejection includes the VOLSER's of all cartridges in subsystem 10 of the requested media type. If all of the cartridges of the media type to be deleted have been removed from subsystem 10, then control 30 in machine operation 257 deletes the media type identification from device table 140. Such deletion ca include a deletion of a media device identification that only services cartridges of the media type being deleted. In this instance, control 30 identifies all media devices to be removed from subsystem 10 to host processor 11.

After completing the media type deletion, either host processor 11 or panel 50 requests a cartridge having the media type. Control 30 examines device table 140 and finds no identification of the media type. Control 30 rejects the command indicating that the requested media type cartridge is not a valid media type for subsystem 10.

Figure 30:
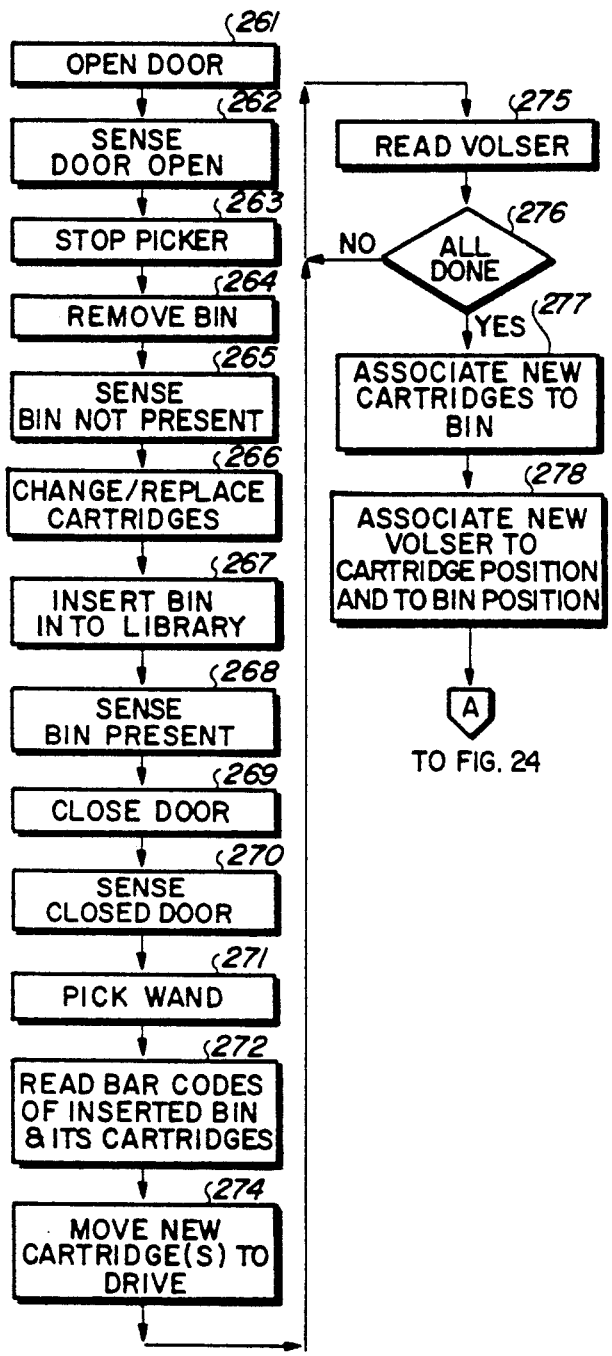

FIG. 30 shows operations of subsystem 10 for changing cartridges in a bin and restoring the bin into its original receptacle 16. The procedure for this operation is similar to earlier described procedures for inserting cartridges and bins into subsystem 10. Machine step 261 requires requesting control 30 to unlock an appropriate door 55. With the door being unlocked, the operator opens the door. A door sensor 115 senses that the door 55 is open. Sensor 115 actuates detector 118 to interrupt microprocessor 90 and inserts the door open status into REG 117. In machine operation 263, microprocessor 90 responds to the door open status to stop picker 33. In manual operation 264, the operator removes the bin from its receptacle 16. The bin sensor 115 in that receptacle detects the removal of the bin to actuate detector 100 for interrupting microprocessor 90 and to insert bin absent status in REG 99. The operator in manual operation 266 removes some (removal =can be one up to the maximum number of cartridges) cartridges and replaces the removed cartridges with other cartridges (the number of replacement cartridges does not have to match the number of removed cartridges), hereinafter new cartridges. In manual operation 267, the operator inserts the bin with the new cartridges into its original receptacle 16. The above-mentioned bin sensor 98 immediately senses the presence of the inserted bin and interrupts microprocessor 90 to indicate a bin has been inserted into the receptacle 16. The operator in manual operation 269 closes the door. Immediately in machine operation 270 the door sensor 115 for the just-closed door signals microprocessor 90 that the previously opened door is now closed. Microprocessor 90 (control 30) then executes machine operations 271 through 276 which are identical to previously described machine operations 220 through 224 of FIG. 26.

Upon completion of machine operation 276, control 30 associates all of the new cartridges with the bin which was removed and returned to the sam receptacle 16 by building data structures in RAM 133. That is, the data to be inserted into cartridge table 154 in columns 159 and 160 are assembled and sorted. Next, machine operation 278 associates the VOLSER's read in machine operation 275 to the cartridge data in RAM 133. The slot position data is also included in RAM 133. From machine operation 278 the previously described machine operations shown in FIG. 24 are performed for updating cartridge table 154. The data describing the new cartridges are overwritten to the previous data. Any empty slot 104 in the last discussed bin results in control 30 erasing the entry data from cartridge table 154. From all of this, it is seen that control 30 automatically tracks any cartridge changes to keep cartridge table 154 current and accurate. After updating the cartridge table 154, the pointers in columns 157 and 159 are preferably changed and sorted to reflect the new cartridges. Therefore, any cartridge swapping, additions or removals are always promptly reflected in cartridge table 154 of retentive store 132.

As a part of reading bar codes in machine operations 221 (FIG. 26) and 272 (FIG. 30), for example, error detection and error recovery procedures are preferably employed. FIG. 31 illustrates, in simplified form, a bar code error processing operation which is a part of the machine operations 221 and 272. Machine operation 280 represents the bar code reading as performed in machine operations 221 and 272. Machine operation 281 checks for errors in the read. Such error checking includes detecting an incorrect number of alphanumeric characters, invalid bar code combinations, check sum errors, etc. If no error is detected by machine operation 281, then machine operations return to the respective FIGS. 26 and 30 illustrated operations. If a bar code reading error is detected, then machine operation 282 resets the wand, i.e. wand 54 is return to its storage location 40 or 41. Assuming that the bar code is a cartridge bar code, machine operation 283 picks the cartridge. If machine operation 284 detects a failure to pick a cartridge, then control 30 logs a cartridge picking error (cartridge sensor signals cartridge present) requiring a check for a missing cartridge. Also, diagnostics for checking operation of wand 54 are employed. If machine operation 284 detects a successfully picked cartridge (the cartridge sensor 103 signals cartridge absent) then machine operations 285 and 286 are performed. Machine operation 285 determines whether additional cartridges are to have bar codes read. If yes, then machine operations 280 et al are repeated. If all cartridge bar codes have been read, then the FIGS. 26 and 30 illustrated operations are resumed.

Detecting bar code reading errors for bin bar codes includes only logging the error. The error is pointed out to the operator who can than check the bin bar code, manually actuate wand 54 in trying to read the bin bar code as a part of error recovery. If the bar code is replaced, then the procedures described for inserting a new bin 26, 27 into a receptacle are used to transfer the bar code value to cartridge table 154. Similarly, when a new bar code label is placed on a cartridge, the inserting a new cartridge procedure replaces the old bar code value with the new bar code value in cartridge table 154. The above described procedures include a predetermined number of bar code read retries, such as nine, before logging a hard error. Any temporary error that is recovered by the repeated readings is also logged for maintenance purposes.

Removing any bin from subsystem 10 requires a request for such removal from either host processor 11 or the operator via panel 50. In any event, removing any bin requires reporting the removal, including the reason for removal, to host processor 11. Control 30 in machine operation 290 (FIG. 32) receives a request from host processor 11 or panel 50 to remove a bin from subsystem 10. Control 30 in machine operation 291 analyses the bin removal request. This analysis includes examining cartridge table 154 for ascertaining whether any cartridges assigned to the bin being removed are affinity cartridges, i.e. belong to an affinity group of cartridges that are to be kept together.

In a version of this invention, one cartridge may belong to two affinity groups. In this latter version, it is preferred that both such affinity groups be stored in a same bin 26/27 or that multiple bins having such dual affinity group cartridges be located in adjacent receptacles 16. Library management is simplified if each cartridge belongs to but one affinity group.

Control 30 keeps a list (not shown) in RAM 133 identifying all of the cartridges currently in each of the media devices 20-21A and currently being transferred by any of the pickers 33 et seq. Control 30 compares the cartridge identities for the bin to be removed with the cartridges still in subsystem 10 that are located either in a media device or are being transported. Upon detecting that one or more cartridges are out of the bin, then control 30 determines whether any of the out-of-bin cartridges have an affinity to the bin. If yes, then the bin should not be removed until the out-of-bin affinity cartridges are returned to the affinity bin. The requirement indicates that all cartridges in an affinity group should be kept together whether in the subsystem or not. If there are no out-of-bin affinity cartridges in subsystem 10, the bin can be removed provided any affinity cartridges in the bin are a member of a second affinity group that extends to another bins. In this instance, the host processor 11 or the operator via panel 50 is queried whether all cartridges in the affinity group are to be removed or the second affinity group cartridges in the bin are to be transferred to another bin currently in subsystem 10. Once this query is answered and implementing requests for keeping all cartridges in the multi-bin affinity group either in or out of subsystem 10 have been removed, then control 30 proceeds to either remove of all bins having cartridges in the multi-bin affinity group or to transfer the multi-bin affinity cartridges to another bin. As an alternate, the bin to be removed can be removed upon host processor 11 request irrespective of having cartridges belonging to a multi-bin affinity group. In the latter instance, host processor 11 should maintain tracking and integrity control of the cartridges in affinity groups which are only partially in subsystem 10.

Upon completion of the above described machine operations, then control 30 in machine operation 294 unlocks a door 55 for enabling manual access to the bin to be removed. Control 30 signals the operator to open the door and remove the bin(s). Door sensor 115 senses an open door in machine operation 195 and signals microprocessor 90 that the door 55 is open. Microprocessor 90 then, via picker control 123, stops pickers 33 et al. The operator in manual operation 297 removes the bin(s). In machine operation 298, bin sensor(s) 98 detect and indicate bin(s) absent. Control 30 verifies that the correct bins have been removed. The operator then closes door 55 in manual operation 299. A door sensor 115 senses and indicates, in machine operation 300, the door 55 closure. Control 30 responds to the door closure indication to restart picker operations. Control 30 then in machine operation 301 deletes all entries relating to the removed bin(s) from cartridge table 154. Finally, in machine operation 302, control 30 reports the bin(s) removal to host processor 11 whether the bin removal request originated from a panel 50 or host processor 11.

FIG. 33 diagrammatically shows two bins, bin 26 for storing twenty-two optical disk cartridges 22 in respective cartridge slots 104 and bin 27 for storing five tape cartridges 23 in bin 27 slots 104. Either bin 26 or 27 fits into any of the receptacles 16. Most of the bins 26 and 27 have no cartridge present/absent sensors, such bins are termed "plain" bins. Each bin 26/27 designated as an IO bin or a security bin has one cartridge present sensor 103 for each slot 104. Even though such IO bin and security bin could be inserted into any receptacle, it is important that such bins be inserted into receptacles designed as shown in FIG. 34. Numeral 151 denotes a positioning reference surface as discussed above with respect to accessing slots in the bins.

Every bin, whether IO, security or plain, has two machine-sensible bin-present markers, preferably permanent magnets for respectively actuating bin sensors 98 (FIGS. 2, 3, 18 and 37). Magnets 105 are positioned on the bins such that the bin is fully inserted into a receptacle 16 before being aligned with magnetic bin sensors 98. Each IO or security bin has electrical contact arrays 305 each contain contacts electrically connected to respective sensors 103. Each receptacle 16, designated as an IO or security receptacle at time of manufacture of a cabinet, includes mating contact arrays 109 and 109A (FIG. 34) which in turn are electrically connected to conductors in cables 108 (FIG. 18). Bin 27, when designated at an IO or security bin, has both sets of contact arrays 305; only one of the two contact arrays 305 of bin 27 are connected to the bin 27 cartridge present sensors 103. The second array (can be either array) can provide a signal pattern indicating no cartridges are present. Additional contacts may be provided in the second array to indicate that the bin 27 has but one tier of cartridges—can be used to indicate bin type. Similarly, extra contacts in the bin 26 contact arrays may indicate bin type. Such type indicates types of media cartridges size of the bin, an IO bin, a security bin and the like. A bin 26/27 which is not an IO nor security bin has no contacts nor other machine sensible indications. A difference between an IO bin and a security bin is that a security bin has a closed wall that faces outwardly, i.e. cartridges are insertable and removable from the security bin through the slot openings facing the transport system 17 and as shown in FIG. 33. An IO bin has two cartridge receiving openings for each slot, one opening to transport system 17 for automatic cartridge insertion and retrieval and one opening outwardly facing from the cabinets 12, 13, 14, 15A and 15B (best seen in FIGS. 1-3.

Each bin has two bar vertically-oriented bar code label positions 306 and 307. The two bar code label positions can be used as a bar code redundancy. Such bar codes also indicate whether or not the bin is a security bin, an IO bin or plain bin. In bin 26, the two bar codes may be different for respectively identifying the upper and lower tiers of cartridge slots. In this regard, the two tiers of slots may be separable, thereby being two separately identifiable bins insertable into one receptacle 16 as a unit. The two label positions on each bin may also be used to provide twice the bar code information of one label. The vertically oriented bar code positions enable the bar code wand 54 to read all bar codes in the vertical direction. As an aid to distinguishing between cartridge bar code labels and bin bar code labels, the bin bar code labels may be oriented horizontally rather than vertically.

FIG. 34 diagrammatically shows a portion of a receptacle 16 array. The circles 98 denote the magnetic sensors that respond to the magnet markers 105 (FIG. 33). Additionally, mechanical sensors 308 respond to insertion of a cartridge holding bin to open or close electrical contacts. Error detection mean may be provided for comparing the actuation of sensors 98 and 308 for each of the receptacles 16. The bin sensors 98 and 308 are electrically connected to respective electrical contacts in electrical connections strips 109 or 109A. The contact arrays 305 of bins 26 and 27 (FIG. 33) have mating contact arrays (not separately shown but are represented in the drawing by contact arrays 109 and 109A in each receptacle 16. The mating contact arrays are electrically connected to contacts in arrays 305 which are in turn electrically connected to cables 108 while the bin sensors 98 and 308 are electrically connected to cables 97 (FIG. 18).

Figure 36:
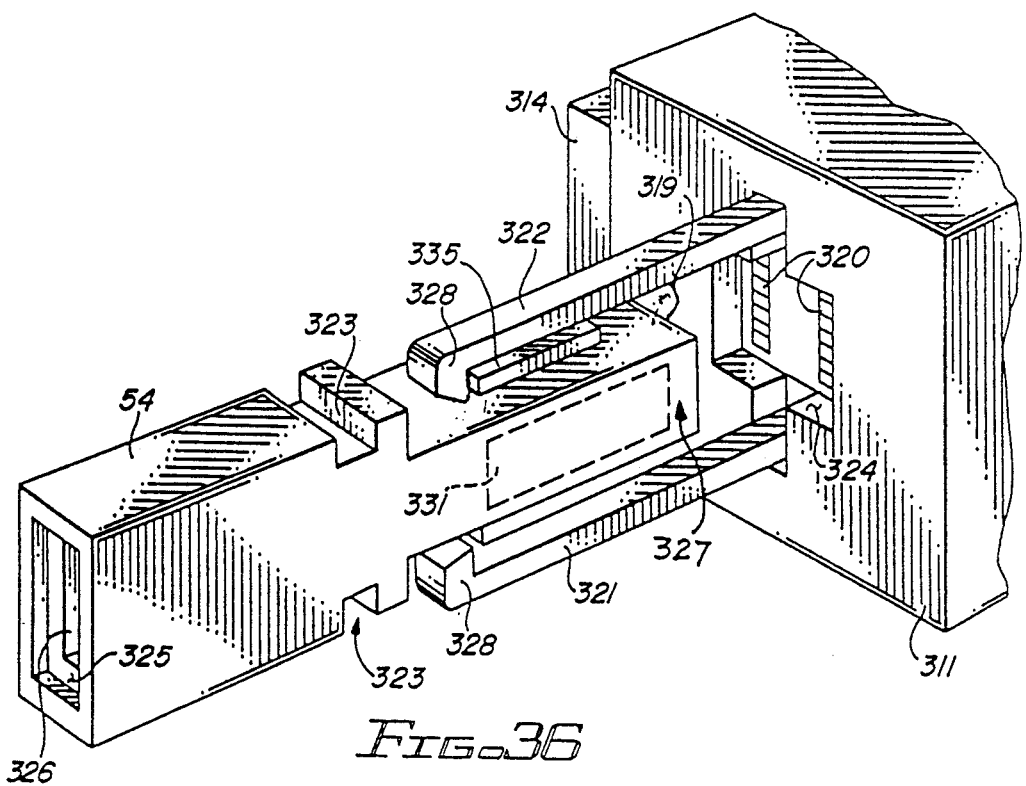

FIG. 35B schematically illustrates the spatial relationship between picker 33, IR transceiver 40 and wand 54 holder 53. The gripper mechanism diagrammatically shown in FIG. 36 is also described. Picker 33 has a carriage (not shown) movably supported by spaced-apart rails (FIG. 2) on which upstanding support 310 is carried. Picker body 311 moves vertically on support 310 in a usual manner. Gripper assembly 312 is mounted in body 311. Body 311 can also pivot about the support 310, as is known in automatic library construction. The gripper consists of upper and lower gripper arms 322 and 321 (best seen in FIG. 36). The arms 321, 322 move apart or together for releasing and gripping a cartridge in its gripper slots 75 (FIGS. 14–16). Wand 54 has identical gripper slots 323 for being carried by picker 33. Flexible power cable 313 is connected to an electrical power supply (not shown) mounted in cabinet 12 (FIGS. 1–3). Alternately, electrical power can be supplied by rails 37 to support, thence to body 311. A flexible cable (not shown) can also extend from body 311 to the carriage for completing a power supply connection.

IR transceiver 314 on body 311 establishes communication by radiation with IR transceiver 40 mounted as explained with respect to FIGS. 2 and 3. IR transceiver 40 has a wide beam indicated by double headed arrow 315 such that irrespective of the vertical or horizontal position of picker 33 with respect to stationary IR transceiver 40. If body 311 is made rotatable, then IR transceiver 314 is mounted on a non rotatable portion of body 311 such that the IR transceivers 40 and 314 are in continuous communication. Wand 54 also has an IR transceiver 331 (FIG. 35B) for receiving read commands from and for transmitting read bar code values to wand control 125 via transceiver 40. Batteries in portion 327 of wand 54 power the bar code reading and IR reception and transmission. Such a battery operated wand 54 may be manually removed from wand holder 53 for manually scanning bin or cartridge bar codes. Such manual scanning mag be used for either cartridges lodged into a bin that is outside the subsystem 10, lodged in the subsystem or individually. An IR communication link has to be established for transmitted read bar codes to a utilization device. Such utilization device is beyond the present description but it may include IR transceiver 40 and control 30.

Bar code wand 54 normally rests in wand receiver 318 of storage location 53 (see FIGS. 2 and 3). Picker 33 in accessing wand 54 moves the gripper arms 321, 322 over outer end portion 327 of wand 54 until gripper arm ends 328 (FIG. 36) are aligned with gripper slots 323 whereupon the arms 321 and 322 are moved toward each other for firmly grasping wand 54. A redundant electrical circuit communication embodiment (which is a backup for the above described IR communication embodiment), outward facing surface 319 of wand 54 contains electrical contacts (not shown) for mating with contact arrays 320 on body 311. Contact arrays 320 are preferably in a recess 329 which receives a outer end portion of extension 327 of wand 54. The recess stabilizes wand 54 during transport and bar code scanning. Other stabilizing mechanisms may be provided in body 311 for stabilizing cartridges and wand 54. Body 311 may have a plurality of gripper assemblies (not shown) for accommodating different cartridge types.

Wand 54 has scanning end recess 325 with bar code scanning window 326 facing outwardly of body 311 as the wand 54 is being carried by picker 33. It is preferred that the bar code scanning be electrical, i.e. the beam is moved vertically from top to bottom of window 326. Such bar code scanning electronics are well known and are not described. Contact arrays 320 provide power to wand 54 to effect the scanning, transfer control signals from wand control 125 to wand 54 and transfer bar code scanned signals from wand 54 to body 311 for transfer over IR transceivers 314 and 40 to control 30.

While the invention has been particularly shown and described with reference to preferred embodiments thereof, it will be understood by those skilled in the art that various changes in form and details may be made therein without departing from the spirit and scope of the invention.

What is claimed is:

1. In an apparatus for storing and retrieving diverse media-containing cartridges, first and second types of said cartridges respectively containing recording media having different physical and data recording characteristics so as to be incompatible such that one media drive does not access both of said first and second types of media, including, in combination:

a plurality of like-sized media-cartridge storing bins, each bin having a predetermined plurality of cartridge receiving and storing slots, a plurality of said media-containing cartridges in said bins;

cabinet means having a first open side;

cartridge storage array means disposed in the cabinet means adjacent said first open side and having first and second oppositely facing open sides, a plurality of like-size bin receptacles in said cabinet means, each said bin having a cartridge access opening at both said first and second open sides for removably receiving respective ones of said cartridges;

an openable door on said first side of the cabinet means for closing the first side for preventing access to said receptacles;

door sensing means on one of said means and disposed in juxtaposition to said openable door for sensing and indicating whether the openable door is closed or open;

bin sensing means disposed in each of said receptacles adjacent said second open side of the array means for sensing and indicating the presence or absence of a bin in the respective receptacle;

a plurality of cartridge-receiving devices in the cabinet means, each said device having a cartridge receiver opening, a first one of said devices being capable of receiving and operating only with a first type of media cartridge having a first cartridge outline, a second one of said devices being capable of receiving and operating only with a second type of media cartridge having a second cartridge outline, said first and second cartridge outlines having different physical dimensions;

cartridge transport means having stationary support means mounted in said cabinet means and cartridge carrier means movably mounted on said stationary support means for accessing any one of said receptacles and said plurality of cartridge-receiving devices for transporting either of said first and second types of media cartridges between said receptacles and said respective cartridge receiver of said first and second devices, respectively; and control means having bin indicating means for indicating which of said bins in said receptacles contain said first and second types of media cartridges, said control means connected to both said sensing means for responding to their respective indications to enable the cartridge transport means to transfer cartridges to and from said bins only if said door sensing means indicates said door is closed, said control means being further responsive for transporting cartridges to and from said bins containing either said first and second type of media cartridges respectively for said first and second one of said devices.

2. In the apparatus set forth in claim 1 further including, in combination:

control radiation means in said control means and being disposed in juxtaposition in said cabinet means to said transport means for sending and receiving airborne signals; and transport radiation means on said transport means and being in communication with said control radiation means for sending and receiving airborne signals to and from said control radiation means for transferring signals with the control means whereby a control cable between the transport means and the control means is not required.

3. In the apparatus set forth in claim 1 further including, in combination:

said first one of said devices being an optical disk device and said second one of said devices being a magnetic tape record device;

said first type of media cartridges respectively containing an optical disk data-storing medium operable with said optical disk device, said second type of media cartridges containing a magnetic tape record medium operable with said magnetic tape record device; and said cartridge carrier means having adjustable cartridge holding means having first and second holding positions, said first and second holding positions respectively for enabling said cartridge carrier means to receive and hold the carrier means to releasably hold said first and second types of said media cartridges.

4. In the apparatus set forth in claim 3 further including, in combination:

one of said receptacles receiving and storing an input-output bin for enabling single cartridges to be inserted into the apparatus and exited from the apparatus, said input-output bin having input and output cartridge slots each said slot having an opening to said cartridge transport means to a predetermined one of said openable doors; and said predetermined one of said openable doors having an access opening for enabling access to said input-output bin input and output slots.

5. In the apparatus set forth in claim 4 further including, in combination:

said control means including means for controlling inserting cartridges into and ejecting cartridges from said apparatus through any of said removable cartridge storing bins in any of said receptacles in the apparatus by removing any one of said plurality of removable cartridge storing bins.

6. In the apparatus set forth in claim 3 further including, in combination:

a first bar code label on each of said bins and facing said transport means; and each said first bar code label on said bins uniquely identifying the respective bins, 7. In the apparatus set forth in claim 6 further including, in combination:

a second bar code label on each of said bins and being disposed on the respective bin for facing in a direction opposite to said first bar code label such that each bin is identified from either of two directions.

8. In the apparatus set forth in claim 6 further including, in combination:

means operative with each of said cartridges for recording a volume serial number (VOLSER) on data storage medium contained in each said cartridge; and said bar code label including an indication of said VOLSER.

9. In the apparatus set forth in claim 6 further including, in combination:

a second bar code label on each of said cartridges; and each said second bar code label facing said transport system while the cartridge to which said second bar code label is affixed resides in a predetermined one of said bins inserted into one of said receptacles.

10. In the apparatus set forth in claim 1 further including, in combination:

affinity means in the control means for identifying a plurality of affinity groups wherein members of each said affinity group have a predetermined affinity for all members in each of said affinity groups, respectively and assigning means in the affinity means for assigning predetermined ones of said cartridges to one of said plurality of affinity groups;

each of said predetermined cartridges in respective ones of said affinity groups being in a bin having cartridges in said respective affinity groups, any bin having cartridges that are members of an affinity group is an affinity bin; and said affinity means retaining said predetermined cartridges in said respective bins whenever said predetermined cartridges are not in one of said devices.

11. In the apparatus set forth in claim 10 further including, in combination:

one of said affinity groups having cartridges of both said first and second types of cartridges; and one or more of said affinity bins storing cartridges belonging to said one affinity group.

12. In the apparatus set forth in claim 10 further including, in combination:

one of said affinity bins storing cartridges from a plurality of said affinity groups as well as storing a cartridge that is not a member of any affinity group.

13. In the apparatus set forth in claim 10 further including, in combination:

a plurality of said affinity bins storing cartridges that are members of one affinity group.

14. In the apparatus set forth in claim 10 further including, in combination:

a plurality of doors in said system, each of said doors, if opened provide manual access to predetermined ones of said receptacles for inserting or removing any one of said predetermined ones of said bins;

electrically actuated door locks respectively locking said doors and said door locks being electrically connected to said control means for being unlocked to permit opening the doors; and affinity protect means in said control means and being connected to said door locks and operative to keep the door locks locked until all cartridges of a predetermined affinity group that are manually accessible through said doors are stored in said predetermined ones of said bins that are affinity bins.

15. In the apparatus set forth in claim 14 further including, in combination:

said affinity protect means having means preventing ejection from said apparatus of any given cartridge that is a member of one affinity group so long as any cartridge in said one affinity group is not stored in an affinity bin storing cartridges that are members of said one affinity group.

16. In the apparatus set forth in claim 15 further including, in combination:

one of said bins in a given one of said receptacles being an input-output bin; and said affinity protect means enabling ejection from said apparatus of said given cartridge through said input-output bin without requiring all cartridges that are members of said one affinity group to be stored in the affinity bin that stores said given cartridges.

17. The apparatus set forth in claim 15, including, in combination:

cartridge assign means in said control means for assigning predetermined ones of said cartridges to one of said affinity bins for storage therein that are not members of any of said affinity groups, said assigned predetermined ones of said cartridges being free cartridges; and said affinity protect means having free means connected to for enabling ejection from said apparatus of said one affinity bin that is assigned to store predetermined ones of said free cartridges that are not currently stored in said one affinity bin.

18. In the apparatus set forth in claim 17 further including, in combination:

said control means having free cartridge reassign means responsive to said affinity protect means for reassigning and moving cartridges not a member of said one affinity group to another bin before enabling manual access to the affinity bin storing said given cartridge.

19. In the apparatus set forth in claim 15 further including, in combination:

command receiving means in the control means for indicating whether or not a command has requested manual access to a predetermined one of said bins; and command interpreting means in the control means and being connected to said command receiving means and to the bin indicating means to indicate manual access is authorized to said predetermined one of said bins and sending said indication to said affinity protect means to inhibit or permit actuating said electrically actuated door locks for permitting said manual access.

20. In the apparatus set forth in claim 15 further including, in combination:

cartridge present sensors in predetermined ones of said bins for indicating whether or not a cartridge is present or not in each slot of said predetermined ones of said bins;

cartridge present responding means in said control means being connected to said cartridge present sensors for responding to a change in cartridge present indication for interrupting operation of said control means; and said control means being responsive to said interruption to actuate said transport means to audit said predetermined one of said bins to validate said change indication.

21. In the apparatus set forth in claim 20 further including, in combination:

one of said predetermined ones of said bins being an input-output bin having a first number of input-output slots for insertion and removal of cartridges to and from the apparatus; and first predetermined ones of said cartridge sensors being in respective ones of said input-output slots.

22. In the apparatus set forth in claim 21 further including, in combination:

second predetermined ones of said cartridge sensors being in bins other than said input-output bin; and multiplex means electrically interposed between said second predetermine ones of said cartridge sensors and said control means.

23. In the apparatus set forth in claim 1 further including, in combination:

a bar code label on each of said bins;

a transportable bar code reader in said transport means;

a battery in said bar code reader for powering same as it is transported;

radiation communication means in said control means and in said transportable bar code reader for transferring data between said bar code reader and said control means;

said control means actuating the transport means cartridge carrier means to carry said bar code reader to an addressed one of said bins and to scan the bar code label on said addressed one of said bins and for receiving a scanned bar code label value from said bar code reader via said radiation communication means.

24. In the apparatus set forth in claim 23 further including, in combination:

an first infrared (IR) transceiver in said radiation communication means mounted adjacent one end of said stationary support means;

a second infrared (IR) transceiver in said radiation communication means mounted on said bar code reader; and said first and second IR transceivers being in a radiation communicating relationship for transferring data signal by an IR beam as said bar code reader is carried by said cartridge carrier means.

25. In the apparatus set forth in claim 23 further including, in combination:

a first infrared (IR) transceiver in said radiation communication means mounted adjacent one end of said stationary support means;

a second infrared (IR) transceiver in said radiation communication means mounted on said cartridge carrier means; and said first and second IR transceivers being in a radiation communicating relationship for transferring data signal by an IR beam for establishing a communication link between said control means and said transport means.

26. In the apparatus set forth in claim 23 further including, in combination:
said carrier means having a cartridge receiver for carrying predetermined ones of said cartridges; and
said bar code reader being receivable into said cartridge receiver for being transported to any of said bins.

27. In the apparatus set forth in claim 1 further including, in combination:
retentive store means in the control means;
a cartridge table retentively stored in said store means and including identifications of each cartridge being stored, each bin present in respective ones of the receptacles, bar code label values, and locations of each cartridge stored in any of said bins;
other tables in said retentive store for indicating predetermined status and configuration of the apparatus;
said retentive store being a random access static memory having retentive data storage characteristics
a first microprocessor in said control means having a random access memory, program means and being connected to all of said means and to the retentive store for creating and maintaining said tables;
electrical door lock means in said cabinet means for locking said openable door(s);
said first microprocessor being connected to said door lock means for actuating the door lock means to lock and unlock said door(s) for controlling manual access to said receptacles;
said bin sensing means upon sensing a bin being inserted into or removed from a receptacle sending an interrupt signal to said first microprocessor;
said first microprocessor responding to said interrupt signal to update said cartridge table to indicate the inserted or removed bin change in status; and
said first microprocessor unlocking and locking the door(s) for enabling said insertion and removal of a bin from a receptacle.

28. In the apparatus set forth in claim 27 further including, in combination:
each said media-containing cartridge having a data storage medium and a VOLSER recorded on its medium;
said first microprocessor, upon receiving said interrupt signal determines that a bin has been inserted into one of said receptacles, sequencing said transport means to serially remove all cartridges from said inserted bin for transporting same to one of said cartridge-receiving devices, respectively;
said first microprocessor actuating said cartridge-receiving devices having received one of said cartridges of said inserted bin to read the VOLSER of said received cartridges and storing said VOLSER's in said cartridge table.

29. In the apparatus set forth in claim 27 further including, in combination:
each ones of a first type of said media-containing cartridges having an optical data storage medium therein;
each ones of a second type of said media-containing cartridges having a magnetic data storage medium therein;
first and second ones of said devices for respectively reading and recording on optical and magnetic data storage media and being respectively adapted to removable receive said first and second types of media-containing cartridges from said cartridge transport means;
one of said other tables being a device table having an address of the device for being accessed by said cartridge transport means, and an indication of the type of media-containing cartridge with which each device is adapted to receive; and
said first microprocessor accessing said device table for determining which of said devices is to removably receive said inserted cartridges.

30. In the apparatus set forth in claim 29 further including, in combination:
said first microprocessor having means for establishing a new media type including means for adding a new entry into said device table for indicating said new media type and for identifying on of said cartridge-receiving devices for said new media type; and
said first microprocessor commanding said transport means to fetch one of said new media type cartridges for transporting same to said identified one of said cartridge-receiving devices for testing whether or not said identified device ca read signals recorded on said new media type cartridge.

31. In the apparatus set forth in claim 30 further including, in combination:
said first microprocessor having means for deleting a given media type from said apparatus, including means for deleting an existing entry from said device table for removing all indications of said given media type; and
said first microprocessor having means for testing said deletion by commanding said transport means to insert a cartridge into one of said cartridge-receiving devices for reading said deleted media, if said device table indicates a device capable of reading the deleted media type, then indicating an error in said device table.

32. In the apparatus set forth in claim 27 further including, in combination:
said first microprocessor having means indicating that predetermined cartridges stored in a given one of said bins in said apparatus are to swapped for other cartridges;
said first microprocessor actuating said electrical door lock means to unlock said door;
said bin sensing means indicating successive removal and insertion of bins from and to a predetermined one of said receptacles;
said first microprocessor actuating said transport means and one of said cartridge-receiving devices to serially remove and return cartridges from and to a bin in said predetermined one of said receptacles;
said first microprocessor actuating said one cartridge-receiving device to identify the serially removed and returned cartridges and to send the identification to said first microprocessor means; and
said first microprocessor changing said cartridge table to indicate the identification of said serially removed and returned cartridges.

33. In the apparatus set forth in claim 27 further including, in combination:

one of said bins in one of said receptacles being an input-output bin having one or more input-output slots, each input-output slot having an internal access facing said transport means and an external access facing away from said transport means;

a cartridge sensor in each of said input-output slots for detecting an insertion or removal of a cartridge into of from each of said one or more input-output slots through said external access;

said first microprocessor responding to said cartridge sensor in the input-output bin to fetch any inserted cartridge and transport same to one of said cartridge-receiving devices;

said first microprocessor having means for actuating said one cartridge receiving device to sense said inserted cartridge for any identifications and to supply said sensed identifications to said first microprocessors; and said first microprocessor assigning a slot in one of said bins for removably receiving said inserted cartridge and for updating the cartridge table for indicating said assignment.

34. In the apparatus set forth in claim 27 further including, in combination:

ones of said cartridges in said apparatus having a bar code label with bar coding identifying the cartridge including a volume serial number (VOLSER) and a medium in the cartridge storing said VOLSER internally to the cartridge;

a bar code reader in said transport means;

said first microprocessor having means for commanding said transporting means to carry said bar code reader to a given one of said cartridges stored in a bin in the apparatus and to activate said bar code reader to scan and read said bar code label on said given the cartridge and to supply said scanned VOLSER to said first microprocessor;

said first microprocessor having means for actuating the transport means to carry the given one cartridge to one of said cartridge-receiving devices and to actuate said one cartridge-receiving device for reading said medium for obtaining said VOLSER stored internally of said cartridge and for supplying the read internally-stored VOLSER to the first microprocessor; and said first microprocessor comparing the bar code VOLSER with the cartridge internal VOLSER, if the comparison indicates a difference between said bar code and internal VOLSER's, then indicating an error condition, otherwise updating the cartridge table by storing said given one cartridge VOLSER in said cartridge table.

35. In the apparatus set forth in claim 27 further including, in combination:

said first microprocessor having means for indicating that given ones of said cartridges in a given one of said bins are to be removed from the apparatus;

said first microprocessor having means responsive to said removal indication to unlock said door(s);

said bin sensing means detecting removal and return of said given bin from and to a receptacle storing said given bin and indicating said removal and return to said first microprocessor as a removal indication;

said first microprocessor responding to said removal indication to actuate said transport means to access said given bin for verifying said removal; and said first microprocessor responding to said verifying to delete indications of said given ones of said cartridges from said cartridge table.

36. In the apparatus set forth in claim 27 further including, in combination:

said first microprocessor having status means for recording in said cartridge table a status indicator for each of said slots in any bin in said apparatus;

said status means having affinity means for indicating an affinity cartridges is stored in a given cartridge receiving slot by recording an A status in said cartridge table or that said given cartridge-receiving slot is reserved for an affinity cartridge by storing an R status in said cartridge table;

said status means having free means for indicating a free or non-affinity cartridge is stored in a predetermined cartridge receiving slot by storing an O indication in the cartridge table or that said predetermined slot is empty and can store a free cartridge by storing an E status in said cartridge table; and said microprocessor having means for preventing storing a non-affinity cartridge in any slot having an R status and for enabling storing any cartridge in a slot indicated by said E status.

37. In the apparatus set forth in claim 36 further including, in combination:

said microprocessor having means for establishing said cartridge table for creating a maximum number of slot indications for each and every one of said bins;

predetermined ones of said bins having given number of slots wherein the number of slots is smaller than said maximum number of slots; and said status means assigning one of said A, R, E or O status to said given number of slot indications for each of said predetermined ones of said bins and inserting a V (vacant) indication in each of said slot indications not assigned to said predetermined ones of said bins, respectively.

38. In the apparatus set forth in claim 36 further including, in combination:

affinity means in the control means for respectively assigning predetermined ones of said cartridges as said affinity cartridges to given ones of a plurality of affinity groups;

each of said affinity cartridges in respective ones of said affinity groups being in a bin having cartridges in said respective affinity groups; and said affinity means connected to said cartridge table for being responsive to said A status for retaining said predetermined cartridges in said respective bins whenever said predetermined cartridges are not in one of said devices.

39. In the apparatus set forth in claim 38 further including, in combination:

said control means having free cartridge assignment means for assigning any of said free cartridges only to ones of said slots having said E status.

40. In the apparatus set forth in claim 39 further including, in combination:

one of said other tables being a slot offset table; and said slot offset table having an entry for each of said bins in said receptacles, respectively;

each of said entries indicating a physical address of said bin and a slot offset value for indicating a physical location of each of each slots in a bin indicated by the respective entries of said slot offset table; and said control means having means for accessing any slot in any bin in the apparatus by calculating a slot address using said slot offset table and said cartridge table, said cartridge table indicating which slot of each bin storing each of said cartridges.

41. In the apparatus set forth in claim 1 further including, in combination:

a bar code label on each of said bins;

a transportable bar code reader removably stationarily mounted in said transport means;

a battery in said bar code reader for powering the bar code read as it is transported;

radiation communication means in said control means and in said transportable bar code reader for transferring data between said bar code reader and said control means;

said control means actuating the transport means cartridge carrier means to access said bar code reader to releasably mount the bar code reader in said cartridge carrier means to carry said bar code reader to an addressed one of said bins and to scan the bar code label on said addressed one of said bins and for receiving a scanned bar code label value from said bar code reader via said radiation communication means.

42. In a data-storage apparatus for storing and retrieving data storing media, including, in combination:

cartridge storage means having support means for removably receiving a plurality of cartridge storing modules, each said module having a plurality of cartridge-receiving slots, each slot having first and second oppositely facing openings, said first and second openings facing respectively in first and second opposite directions, such that data-storing cartridges may be inserted into or removed from the slots through either of said openings;

a plurality of first and second types of data-storing cartridges respectively containing first and second types of media and stored in respective predetermined ones of said slots, said first type of media being incompatible with said second type of media such that said first and second types of media require diverse media playing devices for transferring signals to and from said first and second types of media, respectively;

first and second types of data device means each said data device means having cartridge receiving means with an opening facing said first oppositely facing direction for removably respectively receiving said first and second types of said cartridge into said first and second types of data device means for accessing data stored in said first and second types of said cartridges, said first and second types of data device means not capable of respectively accessing data stored in said second and first types of data cartridges;

transport means facing the first slot openings in said cartridge storing modules and having a cartridge carrier positionable in a predetermined cartridge exchanging relationship to said slots and to said cartridge receiving means opening for transferring said first and second types of said cartridges between said slots and said cartridge receiving means opening respectively in said first and second types of data device means; control means in said data storage apparatus for indicating storage of cartridges in said slots and being connected to said first and second types of said data device means and said transport means for controlling insertion and removal of said cartridges to and from said first and second types of data device means and said slots.

43. In the apparatus set forth in claim 42 further including, in combination:

affinity means in the control means for identifying a plurality of affinity groups wherein members of each said affinity group have a predetermined affinity for all members in each of said affinity groups, respectively and assigning means in the affinity means for assigning predetermined ones of said cartridges to one of a plurality of affinity groups;

said affinity means assigning each of said predetermined cartridges in respective ones of said affinity groups to a module storing cartridges in said respective affinity groups, any said module having cartridges that are members of an affinity group is an affinity module and any cartridge that is a member of an affinity group is an affinity cartridge, any said module or cartridge not an affinity module or cartridge is a free module or cartridge; and said affinity means retaining said predetermined cartridges in said respective affinity module whenever said predetermined cartridges are not in one of said devices and including module ejection means for inhibiting removal of an affinity module from the apparatus until all of the affinity cartridges assigned thereto are present in such affinity module to be ejected.

44. In the apparatus set forth in claim 43 further including, in combination:

said control means having a retentive random-access store storing a rewriteable cartridge table storing identifications of each cartridge being stored, each said module present in respective ones of the receptacles, bar code label values, and locations of each cartridge stored in any of said modules;

other tables in said retentive store for indicating status and configuration of the apparatus;

status means connect to said retentive store in said control means for recording in said cartridge table a status indicator for each of said slots in any said module in said apparatus;

said status means connected to said affinity means for indicating locations of affinity cartridges stored in given cartridge receiving slots by recording an A status in said cartridge table or that said given cartridge-receiving slot is reserved for an affinity cartridge by storing an R status in said cartridge table;

said status means having free means for indicating that a free cartridge is stored in a predetermined cartridge receiving slot by storing an O indication in the cartridge table or that said predetermined slot is empty and can store a free cartridge by storing an E status in said cartridge table; and said affinity means having means for preventing storing a non-affinity cartridge in any slot having an R status and for enabling storing any cartridge in a slot indicated by said E 45. In the apparatus set forth in claim 44 further including, in combination:

said affinity means enabling storing predetermined ones of said affinity and free cartridges in a same one of said modules.

46. In the apparatus set forth in claim 44 further including, in combination:
said affinity means having means for assigning predetermined ones of said cartridges to a given plurality of said affinity groups; and
said affinity means having plural means for assigning cartridges that are assigned to a predetermined one of said affinity groups to be stored in a certain plurality of said modules such that cartridges assigned to said predetermined one of said affinity groups are stored in said certain plurality of said modules.

47. In the apparatus set forth in claim 42 further including, in combination:
lockable access door means for covering said second openings for preventing access to any cartridges in any of said slots having a covered second opening and for providing manual access to said slots if said lockable access door is not covering said second openings;
door means in said control means and connected to said lockable access door means for keeping said access door locked for preventing manual access to any of said cartridges stored in said slots, respectively, and having a opening control for unlocking said access door means; and
said control means having access means connected to said lockable access door means for actuating said lockable access door means to unlock said lockable access door means only when said access means indicates that a manual access to predetermined ones of said cartridges is desired.

48. In the apparatus set forth in claim 47 further including, in combination:
each of said cartridges having first and second bar code labels respectively facing outwardly through said first and second openings.

49. In the apparatus set forth in claim 42 further including, in combination:
first predetermined ones of said cartridges having a first type of media having optical properties for storing information;
second predetermined ones of said cartridges having a second type of media having magnetic properties for storing information; and
said data device means for sensing information in said first predetermined ones of said cartridges, other device means in cartridge receiving relation to the transport means second predetermined ones of said cartridges.

50. In the apparatus set forth in claim 49 further including, in combination:
predetermined ones of said bins having slots for storing said first and second predetermined ones of said cartridges, respectively, such that one bin stores both first and second predetermined ones of said cartridges.

51. In the apparatus set forth in claim 50 further including, in combination:
affinity means in the control means for identifying a plurality of affinity groups wherein members of each said affinity group have a predetermined affinity for all members in each of said affinity groups, respectively and assigning means in the affinity means for assigning given ones said first and second predetermined ones of said cartridges to one of a plurality of affinity groups;
each of said predetermined cartridges in respective ones of said affinity groups being in a bin having cartridges in said respective affinity groups, any bin having cartridges that are members of an affinity group is an affinity bin, one of said bins storing both a first and a second predetermined one of said cartridges; and
said affinity means retaining said given ones of said predetermined cartridges in said respective bins whenever said predetermined cartridges are not in one of said devices.

52. In the apparatus set forth in claim 42 further including, in combination:
a transportable bar code reader removably stationarily disposed in the data storage apparatus in an accessible relationship to said transport means and being receivable by said cartridge carrier;
said transport means accessing said bar code reader for loading said bar code reader onto said cartridge carrier for transporting said bar code reader to said modules for automatically scanning predetermined ones of said bar code labels; and
said control means for actuating the transport means to carry said bar code reader to a predetermined one of said slots for scanning the bar code label of a cartridge stored in said predetermined one of the slots.

53. In an apparatus for storing data in a plurality of independently controlled library subsystems, including, in combination:
each of said plurality of library subsystems including storage rack means having an open face and a plurality of addressable bin-receiving receptacles;
a plurality of cartridge-storing bins removably stored in respective ones of said receptacles and having cartridge access openings to cartridge-storing slots facing and opening to said open face;
a plurality of data-storing cartridges stored in respective predetermined ones of said slots in said bins;
a data device having cartridge receiving means for receiving said cartridges for accessing data stored therein;
an input-output station for inserting and removing data storing cartridges into and from said data-storage apparatus;
transport means in cartridge exchanging relationship to said receptacles and to said device for transferring cartridges between said bins, said input-output station and said device;
control means in said apparatus for indicating storage of cartridges in said bins and being connected to said device, said transport means, said input-output station for enabling insertion and removal of data cartridges to and from the apparatus and for enabling insertion and removal of said bins to and from said receptacles for inserting and removing cartridges to and from the apparatus;
said bins and cartridges in each of said libraries being identical such that said insertion and removal of cartridges into and from any of said plurality of libraries can be achieved by insertion and removal of said bins to and from receptacles in the respective libraries;
said bins consisting of first and second types of bins; said first type of bin having a plurality of first cartridge receiving compartments for respectively receiving and holding cartridges having a predetermined minimum size, said minimum size including one constant dimension and a first dimension perpendicular to the constant dimension;

said second type of bin having a predetermined number of said first cartridge receiving compartments and a given number of second cartridge receiving compartments, each one of said second cartridge receiving compartments having said one constant dimension and a second dimension transverse to the constant dimension that is greater than said first dimension by an integral multiplicative factor such that each of said second compartments can removably receive one of said cartridges having a dimension perpendicular to said constant dimension that is greater than said first dimension;

said receptacles in all of said libraries each being capable of storing either one of said first types of bins or said integral multiplicative factor of said second types of bins;

first and second types of said cartridges, said first type of cartridge having a first set of dimensions and moving containing a disk-shaped disk-storage medium for storing said data stored in said first type of cartridge, said second type of cartridge having a second set of dimensions at least one of which is greater than said one constant predetermined dimension of said first type of cartridge and movably containing an elongated tape data-storage medium for storing said data stored in said second type of cartridge;

said first type of cartridge being storable in either said first or second type of said bins and said second type of cartridge being storable only in said second compartments in said second type of bins;

affinity means in the control means of each of said library subsystems having identifying means for identifying a plurality of affinity groups wherein members of each said affinity group have a predetermined affinity for all members in each of said affinity groups, respectively;

assigning means in the affinity means for assigning predetermined ones of said cartridges to one of a plurality of affinity groups, each of said affinity groups existing in one of said library subsystems;

each of said predetermined cartridges in respective ones of said affinity groups being in a bin having cartridges in said respective affinity groups, any one of said bins having cartridges that are members of an affinity group being an affinity bin, each cartridge that is a member of an affinity group being an affinity cartridge; and said affinity means controlling said transport means for retaining said predetermined cartridges in said respective bins whenever said predetermined cartridges are not in one of said devices such that transfer of cartridges between said library subsystems via bin removal and insertion is inhibited unless all affinity cartridges assigned to an affinity bin are stored in said affinity bin being transferred from one of said libraries to another of said libraries in a predetermined one of said bins.

54. In the apparatus set forth in claim 53 further including, in combination:

predetermined ones of said bins having slots for storing said first and second predetermined ones of said cartridges, respectively, such that one bin stores both first and second predetermined ones of said cartridges.

55. In the apparatus set forth in claim 54 further including, in combination:

each of said library subsystems having a plurality of said cartridges not assigned to any of said affinity groups that are termed free cartridges;

each of said affinity means in the respective library subsystem reserving predetermined slots in said affinity bins for storing said affinity cartridges;

free ones of said bins having no reserved affinity slots; and transferring said free bins or said affinity bins having a predetermined number of free cartridges between said library subsystems without said free cartridges if such free cartridges are not stored in said bins being transferred at the time of transfer.

56. In an apparatus for storing a plurality of data cartridges including a control communications systems, including, in combination:

a library having a plurality of data cartridge storing receptacles opening to a common wall and data cartridge transport means movably disposed along the common wall for fetching and storing cartridges from and to addressed ones of said receptacles;

control means stationarily disposed with respect to said receptacles;

an infrared (IR) communication system in said library for connecting said control means to said transport means comprising a first IR transceiver stationarily mounted at one extremity of the movement of said transport means for emitting and receiving IR signals modulated to carry information and a second IR transceiver mounted in said transport means for receiving said IR signals from the first IR transceiver and for emitting IR modulated signals to said first IR transceiver;

said transport means having a cartridge carrier mounting said second IR transceiver for movement to said receptacles;

a battery operated bar code reader mounting said second IR transceiver;

a bar code reader storage means including battery charging means stationarily mounted with respect to said receptacles and for receiving for removable storage said bar code reader and for charging the battery in said bar code reader;

a cartridge carrier in the transport means and having means for fetching and storing said bar code reader and carrying same to any of said receptacle to scan for bar code labels and for transmitting signals to and receiving signals from the control means via said IR transceivers; and said control means connected to said first IR transceiver for sending control signals to the bar code reader for scanning for a bar code label in each of said receptacles and for receiving bar code indicating signals from the bar code reader.

57. In the apparatus set forth in claim 56 further including, in combination:

said cartridge carrier having a cartridge receiver for removably receiving data cartridges and for removably receiving said bar code reader; and said control means actuating the transport means for either carrying a cartridge or said bar code reader.

58. In the apparatus set forth in claim 57 further including, in combination:

said second IR transceiver including a first portion on said cartridge carrier and a second portion on said bar code reader.

59. In a machine-effected method of operating a data storage library subsystem having a plurality of data cartridges, an open walled storage rack having a plurality of receptacles and a transport system having cartridge carrying means disposed for movement along said open walled rack for fetching and storing cartridges from and in said receptacles, a data device having a cartridge-receiving opening to said transport system for receiving and yielding said data cartridges from and to the transport system whereby said cartridges are transported between said receptacles and said device, including the machine-executed steps of:

making each of said receptacles capable of removably receiving a cartridge bin, each said bin being capable of storing a plurality of said cartridges in slots opening to said transport system for making each cartridge individually accessible by the transport system without moving any other cartridge;

inserting a given plurality of said bins, each said bin holding a predetermined plurality of said cartridges, into said given plurality of said receptacles, respectively;

inserting and removing said cartridges into and from the library subsystem by inserting and removing any one of said bins such that each said bin is a cartridge input-output means and a part of said storage rack for enabling the transport system to transport said cartridges between any one of said bins and said device;

selecting said bins to store and carry a plurality of diverse types of said data cartridges, said diverse type including incompatible physical dimensions and having diverse recording capabilities including optically sensible media in first ones of said diverse types and magnetically sensible media in second ones of said diverse types; and providing a separate device for sensing each of said types of cartridges and media.

60. In the machine-effected method set forth in claim 59 further including the machine-executed steps of:
one of said bins removably receiving and holding first and second types of said cartridges.

61. In the machine-effected method set forth in claim 60 further including the machine-executed steps of:
making all of said receptacles to be one size;
selecting said bins to have diverse sizes, each said bin size being an integral submultiple of said one size such that each receptacle can removably receive one or more of said bins of said diverse sizes.

62. In the machine-effected method set forth in claim 59 further including the machine-executed steps of:
establishing a plurality of affinity groups wherein members of each said affinity groups have a predetermined affinity for all members is each of said affinity groups, respectively;
assigning predetermined ones of said cartridges to one of a given plurality of said affinity groups to be affinity cartridges;
assigning predetermined ones of said bins to be affinity bins as members of predetermined ones of said affinity groups;
storing predetermined ones of said affinity cartridges belonging to one of said affinity groups in one of said affinity bins and retaining said affinity cartridges of said one affinity group in said one affinity bin whenever said affinity cartridges are not lodged in said device; and
removing an affinity bin from the library subsystem only when all of the affinity cartridges assigned to said affinity bin to be removed are actually in said affinity bin to be removed.

63. In the machine-effected method set forth in claim 62 further including the machine-executed steps of:
selecting said bins to store and carry a plurality of diverse types of said data cartridges, selecting said diverse types of said data cartridges to have predetermined incompatible physical dimensions and diverse recording capabilities including optically sensible media in first ones of said diverse types of said data cartridges and magnetically sensible media in second ones of said diverse types of said data cartridges;
providing a separate said device for exchanging signals with a medium in each of said types of cartridges and media; and
assigning predetermined ones of said cartridges to said one affinity groups that are diverse types of said cartridges.

64. In the machine-effected method set forth in claim 62 further including the machine-executed steps of:
assigning and storing predetermined ones of said affinity cartridges that are members respectively of a plurality of said affinity groups in one of said bins.

65. In the machine-effected method set forth in claim 62 further including the machine-executed steps of:
designating cartridges that are not a member of any affinity group as free cartridges;
in one of said bins storing affinity cartridges that respectively are members of an affinity group and free cartridges that are not a member of any of said affinity groups; and
ejecting said one bin from the library subsystem only if all of said affinity cartridges that are members of a same affinity group are stored in said one bin and regardless if all of said free cartridges are stored in said one bin.

66. In the machine-effected method set forth in claim 65 further including the machine-executed steps of:
providing an input-output bin in said library subsystem, said input-output bin enabling insertion and removal of single cartridges into and from the library subsystem; and
inserting and removing cartridges into and from said library subsystem via said input-output bin one at a time regardless if the cartridge being inserted or removed is a said affinity or free cartridge.

67. In the machine-effected method set forth in claim 66 further including the machine-executed steps of:
establishing and maintaining a cartridge table, said cartridge table including machine sensible indications of each said receptacle, the number of said cartridges stored in each said receptacle, the affinity group to which each said cartridge belongs, if any, and the status of each said slot in each said bin as to whether said slot is occupied by a said affinity cartridge, reserved for a said affinity cartridge, occupied by a said free cartridge or empty and for storing any of said cartridges.

68. In the machine-effected method set forth in claim 59 further including the machine-executed steps of:
establishing a control in said library subsystem; and
providing radiation communication between said control and said transport system.

69. In the machine-effected method set forth in claim 68 further including the machine-executed steps of:
selecting said radiation communication to be infrared and providing transceiver in the transport system for movement along said receptacles and a stationary transceiver and electrically connecting the stationary transceiver to said control.

70. In the machine-effected method set forth in claim 59 further including the machine-executed steps of:
adding bar codes to each of said bins for identifying the respective bins independently of which said receptacle holds said bin;
providing a battery operated bar code reader and storing the bar code reader in a stationary battery charging station accessible by said transport means;
carrying said cartridges in a cartridge receiver of said transport system; and
fetching and carrying said bar code reader from said station by and in said cartridge receiver for scanning one of said bar codes labels on an addressed one of said bins.

71. In the machine-effected method set forth in claim 70 further including the machine-executed steps of:
establishing a control in said library subsystem;
providing infrared communication between said control and said bar code reader; and
transmitting bar code read signals from said bar code reader over said infrared communication to said control.

72. In the machine-effected method set forth in claim 71 further including the machine-executed steps of:
affixing bar code labels to each of said data cartridges on a surface of said cartridge facing said transport means as held in said bins received by said receptacles, respectively; and
moving said bar code reader to addressed ones of said cartridges for reading said bar code labels, respectively.

73. In the machine-effected method set forth in claim 72 further including the machine-effected steps of:
affixing two of said bar code labels on each of said data cartridges such that one label faces the transport system and a second label one each cartridge faces away from said transport system.

74. In the machine-effected method set forth in claim 72 further including the machine-effected steps of:
recording a predetermined volume serial number (VOLSER) on a data storage medium in each of said cartridges; and
in said affixing step, affixing said bar code label to have an indication other than said predetermined VOLSER.

75. In the machine-effected method set forth in claim 74 further including the machine-effected steps of:
including in predetermined ones of said bar code labels on said data cartridges an indication of a computer application to which said data stored in said data cartridge relates.

76. In the machine-effected method set forth in claim 75 further including the machine-effected steps of:
establishing a plurality of affinity groups wherein members of each said affinity groups have a predetermined affinity for all members is each of said affinity groups, respectively;
assigning predetermined ones of said cartridges to one of a given plurality of affinity groups;
designating predetermined ones of said bins as affinity bins for receiving and storing said assigned predetermined ones of said cartridges assigned to said affinity groups, respectively;
storing affinity ones of said cartridges belonging to one of said given plurality of affinity groups in one of said bins and retaining said affinity cartridges of said one affinity group in said one affinity bin whenever said affinity cartridges are not lodged in said device; and
reading the bar code labels on said affinity ones of said cartridges for ascertaining which of said affinity groups said affinity ones of said cartridges are assigned.

77. In the machine-effected method set forth in claim 59 further including the machine-effected steps of:
providing a plurality of said library subsystems; and
transferring cartridges between said plurality of library subsystems by removing and inserting ones of said bins from one of said library subsystems and into another of said library subsystems.

78. In the machine-effected method set forth in claim 59 further including the machine-executed steps of:
providing electrically lockable doors in said library subsystem for controlling manual access to bins removably received in respective ones of said receptacles; and
unlocking said lockable doors only when all affinity cartridges assigned to a predetermine one of said bins are in said predetermined one of said bins.

79. In the machine-effected method set forth in claim 59 further including the machine-effected steps of:
automatically adding a new media type to said library subsystem including providing a device for said new media type and bins capable of holding said new media type.

80. In the machine-effected method set forth in claim 79 further including the machine-effected steps of:
automatically deleting a media type from said library subsystem including removing all cartridges of said deleted media type.

81. In the machine-effected method set forth in claim 59 further including the machine-effected steps of:
removing a bin from said library subsystem;
manually removing certain ones of said cartridges stored in said removed bin and inserting different cartridges into said bin; and
reinserting said bin into the same receptacle from which it was removed.

82. In the machine-effected method set forth in claim 59 further including the machine-effected steps of:
automatically indicating that manual access to said bins held by said receptacles is to be permitted; and
providing a plurality of independent sources for said automatic indication.

83. In an apparatus for storing and retrieving diverse media-containing cartridges, first and second types of said cartridges respectively containing recording media having different physical size and outline, storage media in said first and second types of said cartridges having data recording characteristics so as to be incompatible, including, in combination:
cabinet means having a first open side;
cartridge storage array means disposed in the cabinet means adjacent said first open side and having first and second oppositely facing open sides, a plurality of first and second size cartridge-receiving and storing slots opening at said first open side;
a plurality of cartridge-receiving devices in the cabinet means, each said device having a cartridge receiver opening, a first one of said devices being capable of receiving and operating only with said first type of media cartridge having said first cartridge outline, a second one of said devices being capable of receiving and operating only with said second type of media cartridge having said second cartridge outline, said first and second cartridge outlines having different physical dimensions;

cartridge transport means having stationary support means mounted in said cabinet means and cartridge carrier means movably mounted on said stationary support means for accessing any one of said receptacles and said plurality of cartridge-receiving devices for transporting either of said first and second types of media cartridges between said receptacles and said respective cartridge receiver of said first and second devices, respectively; and control means having slot indicating means for indicating which of said slots said first and second types of media cartridges can be stored, said control means actuating the cartridge transport means to transfer said first and second types of cartridges between said slots to said first or second device, respectively.

84. In the apparatus set forth in claim 83, including, in combination:

said first type of media cartridge being a disk containing cartridge having a first size and shape having two predetermined exterior dimensions;

said second type of media cartridge being a tape containing cartridge having a second size and shape that includes at least two dimensions that are greater than said two predetermined dimensions of said disk cartridges;

said first type of device being a disk medium playing device having a cartridge receiver for receiving said disk-containing cartridge; and said second type of device being a tape medium playing device having a cartridge receiver for receiving said tape containing cartridge.

* * * * *